(12) United States Patent
Mohri

(10) Patent No.: US 6,629,146 B1
(45) Date of Patent: Sep. 30, 2003

(54) SELECTION INTERMEDIARY APPARATUS, TRANSMISSION APPARATUS, SELECTION INTERMEDIARY PROGRAM STORAGE MEDIUM AND TRANSMISSION PROGRAM STORAGE MEDIUM

(75) Inventor: Takao Mohri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/571,939

(22) Filed: May 16, 2000

(30) Foreign Application Priority Data

Jun. 22, 1999 (JP) .......................................... 11-175829

(51) Int. Cl.[7] .............................................. G06F 15/16
(52) U.S. Cl. ........................ 709/232; 709/230; 709/231; 370/238
(58) Field of Search ................................. 709/230, 231, 709/232, 233, 234, 235; 370/351, 352, 389, 253, 252, 238.1, 238

(56) References Cited

U.S. PATENT DOCUMENTS 6,351,745 B1 * 2/2002 Itakura et al. ................. 707/10
6,513,038 B1 * 1/2003 Hasegawa et al. ............. 707/7
6,519,936 B2 * 2/2003 Smatloch et al. ............. 60/297

OTHER PUBLICATIONS

Memorandum, Jun. 1999, Vinca Corporation, "Standards Track".

"Jini™ Technology Core Platform Specification," Sun Microsystems, May 2000.

"Trading Object Service Specification," CORBAservices, Mar. 1997 pp. 16–16–22.

"Domain Names—Concepts And Facilities," 54 pp., Nov. 1987.

* cited by examiner

Primary Examiner—Mehmet B. Geckil
(74) Attorney, Agent, or Firm—Staas & Halsey LLP

(57) ABSTRACT

There is disclosed a selection intermediary apparatus which reduces the cost of an intermediary system. The apparatus is provided with a request/response processor 235 which selects and outputs a message based on path information 233a, and path information preparing/propagating section 232 which generates a condition more moderate than a selection condition based on the path information 233a as the selection condition and propagates the generated condition to a client-side agent.

14 Claims, 30 Drawing Sheets

SELECTION INTERMEDIARY APPARATUS, TRANSMISSION APPARATUS, SELECTION INTERMEDIARY PROGRAM STORAGE MEDIUM AND TRANSMISSION PROGRAM STORAGE MEDIUM

BACKGROUND OF THE INVENTION (i) Field of the Invention

The present invention relates to a selection intermediary apparatus for selecting and relaying a message, a transmission apparatus for transmitting the message, a selection intermediary program storage medium in which a selection intermediary program is stored to operate a computer system as the selection intermediary apparatus, and a transmission program storage medium in which a transmission program is stored to operate the computer system as the transmission apparatus.

(ii) Description of the Related Art

In the present day when networks such as Internet and Intranet are developed, a large number of servers are present on the network. A user selects a server in accordance with a purpose through a client program, and accesses the server to perform processings such as information retrieval and registration to a database. This access is realized when a message requiring the processing is transmitted on the network.

When a plurality of servers are present in this manner, in a conventional art, a client side needs to know the following two pieces of information beforehand:

(1) the place where the server exists (server address); and (2) the service presented by the server (server service content).

Here, since the service content of the server is used as a condition in selecting the server, it is hereinafter referred to as the "server condition". Moreover, a pair of the above information (1) and (2) is referred to as a "rule", and a group of rules is referred to as "path information" because a message transmission path is determined. Furthermore, the message requiring the processing is hereinafter referred to as the "request" in some cases.

The path information is obtained by the user in a certain method and inputted during operation of a client program, or is directly embedded in the client program. Therefore, when the address or condition of the server changes, the information needs to be notified to the user, or the client program needs to be changed every time. However, when the server address, and the like frequently change, the notification or change is difficult.

Therefore, in order to solve the problem, there has been developed an intermediary system in which a program or a selection intermediary apparatus, referred to as an agent, is placed in a certain address on a network, and the agent selects and relays a message between a client and a server. In a most basic constitution of the intermediary system, only one agent is disposed between the client and the server.

FIG. 1 is a schematic view of an intermediary system by a single agent.

One or more sets of a server condition and an address are registered in Agent 1. Client C knows the address of Agent 1, and once sends all requests to Agent 1. The request sent from the client C is constituted of a client designated condition indicating the server designated by the client C for sending the request, and a request text to be sent to the selected server. The client designated condition is compared with a server condition, and only the request which satisfies the server condition is sent to Server 1, Server 2 indicated by the address corresponding to the server condition. Specifically, Agent 1 compares the client designated condition with the server condition, selects the appropriate server Server 1, Server 2 which satisfies the request from the client C, and transfers the request from the client C. Thereafter, a response obtained as a result of a processing by Server 1, Server 2 is returned to the client C. In this intermediary system, since the user or the client does not have to know the address or service content of the server beforehand, the burden on the client side is light. Moreover, in the intermediary system, since the path information is concentrated on one place, maintenance is easy.

The above-described system by the single agent can easily be constructed, and operates without any problem when the system scale is small. However, when the system intends to be enlarged still with the single agent, various problems arise.

First, a problem occurs that the load during the operation is concentrated on the agent. In the system by the single agent, all communications between the client and the server are concentrated on one agent. Therefore, when the number of clients or servers increases, the agent is easily bottlenecked.

Moreover, when the network is connected to a large number of servers, the server management including the management of the server condition, and the like is allotted to a plurality of managers in many cases. However, in the system by the single agent, since the path information including the server condition to be managed by each manager is concentrated on one agent, it is difficult to limit the range of the server condition to be opened to the public, and a problem on security easily occurs.

Since such problem occurs in the system by the single agent, an intermediary system has to be constructed by a plurality of agents particularly for an enlarged system scale. Moreover, when the intermediary system by the agent is spread, one system is constructed by connecting the systems each operating by the single agent to one another in many cases. In this case, instead of combining a plurality of already operating agents to construct the system by a single huge agent, when the system is constructed by a plurality of agents so that the agents perform communication and cooperate with one another, the system is easily realized without necessarily modifying the existing system.

FIG. 2 is a schematic view of the intermediary system by a plurality of agents.

In the system by the plurality of agents, when the agent transfers the request from the client to the server connected to another agent, the agent needs to know the server condition, and the like owned by the other agent.

The system of teaching the server condition, and the like to the other agent from the certain agent is roughly divided to two types of systems, an advertisement system and a replication system.

FIG. 3 is an explanatory view of the advertisement system.

In the advertisement system, a certain agent generates a rule whose address is rewritten to its own address based on its own rule, and propagates and registers the generated rule to another agent. This registration extends a link for transferring the request to the other agent from the agent. In an example shown in FIG. 3, Agent 2 rewrites its rule address "Server 3", "Server 4", to its own address "Agent 2", and transmits the address together with server conditions "Condition 3", "Condition 4" to Agent 1, and as a result, a conditioned link is extended to Agent 2 from Agent 1. In the following, the agent to which the server condition, and the like are registered, such as Agent 1, is referred to as a "client-side agent", and the agent which sends the server condition, and the like, such as Agent 2, is referred to as a "server-side agent". The server condition registered in the client-side agent is explicitly set (conditioned link) in some cases, and the condition is not particularly set (unconditioned link) in other cases. Moreover, as seen from the server-side agent, the client-side agent functions as a message transmission apparatus.

When the above-described conditioned link is extended, the request reaching the client-side Agent 1 from the client C is first compared with the server condition owned by the client-side Agent 1. When the server condition is satisfied, the request is transferred to the server-side Agent 2 which is designated as a transfer destination. Subsequently, the request is compared with the server condition owned by the server-side Agent 2, and the next transfer-destination server is determined. When the server condition, and the like are propagated in this manner in the advertisement system, the request from the client C is necessarily passed via the server-side Agent 2 in which the server is already registered. The propagation of the server condition, and the like by the advertisement system is hereinafter referred to simply as "advertisement" in some cases.

FIG. 4 is an explanatory view of the replication system.

In the replication system, the agent propagates and registers a copy of the set (rule) of the server condition and server address owned by itself to the other agent. Since the server addresses are registered in the agent having received the copy, the request is directly sent to the servers.

As the example resulting, from propagation of the copy by the replication system, FIG. 4 shows an example in which the copies of the server conditions "Condition 3", "Condition 4" and addresses "Server 3", "Server 4" owned by the server-side Agent 2 are propagated to the client-side Agent 1. As a result of the propagation, Agent 1 and Agent 2 have the same server conditions "Condition 3", "Condition 4", and Agent 1 uses the server conditions "Condition 3", "Condition 4" to evaluate the request from the client C by itself, so that the request is directly sent to the Server 3, Server 4 without being passed via Agent 2. The propagation of the copy by the replication system is hereinafter referred to simply as "replication" in some cases.

When the above-described advertisement or replication is executed, and the respective server conditions and addresses are generated based on the rule and propagated to the client-side agent, the respective server conditions are usually generated with respect to all the rules constituting the path information owned by the server-side agent. Therefore, the group of the sets of the server conditions and addresses propagated to the client-side agent is also referred to as the "path information" in some cases.

Additionally, in the system in which a large number of servers and agents are connected via the communication network, it is contemplated that the disconnection of the servers constituting the system from the system, or the interruption of the communication network for connecting the servers and agents frequently occurs. Therefore, there is a high possibility that the server conditions and addresses propagated by the above-described advertisement and replication form incorrect information in some periods. Therefore, it is preferable to set an effective period to the server condition to be propagated, and again perform the advertisement before the effective period elapses.

However, when the system scale is large, a problem is that the propagation amount of the server conditions propagated in the entire system by the advertisement or the replication increases, thereby raising the propagation cost.

Moreover, in the advertisement in which the server condition is unconditioned, since the information amount of the server condition is small, the above-described propagation cost is low. However, since any message is transferred to the server-side agent without any condition, there is a problem that the message transfer cost is high.

SUMMARY OF THE INVENTION

In consideration of the above-described situations, an object of the present invention is to provide a selection intermediary apparatus which can reduce the cost of an intermediary system, a transmission apparatus which can reduce the intermediary system cost, a selection intermediary program storage medium in which a selection intermediary program is stored to operate a computer system as the selection intermediary apparatus, and a transmission program storage medium in which a transmission program is stored to operate the computer system as the transmission apparatus.

To attain the above-described object, according to the present invention, there is provided a selection intermediary apparatus comprising: reception means for receiving a message transmitted from a transmission apparatus for transmitting the message;

output means for selecting and outputting the message received by the reception means on a predetermined condition;

condition generation means for generating a condition more moderate than the selection condition based on the selection condition of the output means; and advertisement means for presenting the condition generated by the condition generation means to the transmission apparatus, and requesting the transmission apparatus to select and transmit the message on the condition.

Here, the "condition more moderate than the selection condition" means that the message including the message selected in accordance with the selection condition is selected, and that more messages than the messages selected in accordance with the selection condition are selected. Moreover, "based on the selection condition" means that the above-described unconditioned state is excluded.

According to the selection intermediary apparatus of the present invention, the condition generation means generates the "condition more moderate than the selection condition", and the advertisement means applies the generated condition to the transmission apparatus. Specifically, the above-described advertisement is extended.

In this extended advertisement, for the server condition propagated to the client-side agent, the same server condition as the original server condition owned by the server-side agent is a most detailed and strict condition, and no-condition with nothing designated is a most abstract and moderate condition.

When the server condition registered in the client-side agent is contradictory to the server condition held by the server-side agent, or is more restrictive than the server condition, even the request satisfying the original server condition held by the server-side agent is probably inhibited from being transferred to the server-side agent. Specifically, the transfer of the request which originally has to be transferred to the server is inhibited, and a problem arises.

Conversely, when the server condition more moderate and abstract than the original server condition is registered in the client-side agent by the above-described extended advertisement, the client-side agent transfers a new request to the server-side agent because of the abstracted server condition. However, since the new request does not satisfy the server condition owned by the server-side agent, the transfer to the server is inhibited. Specifically, as seen from the server, even when the abstracted condition is used by the client-side agent, the request sent to the server is unchanged and has no problem.

Additionally, generally, the detailed server condition requires a large data size for representing the server condition, and also requires a high propagation cost. Therefore, in the above-described extended advertisement, the propagation cost of the server condition has a tradeoff relation with the transfer cost of the request from the client. For example, when the server condition of the server-side agent is completely copied to the client-side agent, only the request satisfying the server condition is transferred among the requests from the client. Therefore, the cost for transferring the request from the client is minimized, but the cost for propagating the server condition is maximized. Conversely, when the server condition is unconditioned, the cost for propagating the server condition is minimized. However, since all the requests are transferred to the server-side agent, the request transfer cost is maximized. Therefore, in the advertisement in which the condition more moderate than the server condition of the server-side agent is propagated, both the server condition propagation cost and the request transfer-cost are reduced, thereby reducing the total cost of the intermediary system.

In the selection intermediary apparatus of the present invention, may, the output means selects and outputs the message received by the reception means in accordance with a composite condition constituted of the logical product of a plurality of individual conditions, and in generating the condition, the condition generation means generate the condition constituted of the logical product of the remaining individual conditions obtained by excluding one or more individual conditions from the above-described plurality of individual conditions.

Alternatively, may, the output means outputs the message received by the reception means to a plurality of output destinations, and selects and outputs the message on the composite condition according to the output destination constituted of the logical product of one or more individual conditions, and in generating the condition, the condition generation means extract the individual conditions common to the respective composite conditions of the selection by the output means, and generate the condition constituted of the logical product of the extracted individual conditions.

A procedure of generating the condition by the condition generation means will be described later in detail.

Moreover, in the selection intermediary apparatus of the present invention, it is preferable that, the condition generation means receives a predetermined instruction, and newly generates a condition more moderate than the selection condition by the output means and stricter than the condition already applied to the transmission apparatus by the advertisement means.

the selection intermediary apparatus comprises first cost comparison means which compares an application cost necessary for applying the condition newly generated by the condition generation means to the transmission apparatus with a transmission cost necessary for transmitting the message stopped from being transmitted from the transmission apparatus if the newly generated condition is applied to the transmission apparatus, and when the transmission cost is larger as a result of comparison by the first cost comparison means, the advertisement means preferably applies the condition newly generated by the condition generation means to the transmission apparatus.

According to the selection intermediary apparatus provided with the first cost comparison means, advertisement is performed based on the cost comparison by the first cost comparison means, so that the cost is further lowered.

Furthermore, the selection intermediary apparatus of the present invention further comprises: second cost comparison means for obtaining and comparing an intermediary cost of the message received by the reception means, with a transmission cost if the message is directly transmitted to the output destination of the output means from the transmission apparatus;

replication means for applying the same condition as the selection condition by the output means to the transmission apparatus, and requesting the transmission apparatus to select the message in accordance with the applied condition and directly transmit the message to the output destination of the output means; and switch means for operating the replication means instead of the advertisement means when a result of comparison by the second cost comparison means shows that the transmission cost is lower than the intermediary cost.

According to the selection intermediary apparatus provided with the switch means, and the like, when replication is cost-effective, the replication is employed instead of the advertisement. This further reduces the cost.

To attain the above-described object, according to the present invention, there is provided a first transmission apparatus comprising: input means to which a message is inputted;

transmission means for selecting and transmitting the message inputted to the input means;

condition acquirement means for acquiring a condition of selection by the transmission means from the transmission destination of the transmission means;

third cost comparison means for comparing a necessary transmission cost if the message inhibited from being transmitted as a result of the selection is transmitted by the transmission means, with an acquirement cost necessary for acquiring the condition by the condition acquirement means; and first transfer means for transferring the comparison result by the third cost comparison means to the transmission destination.

According to the first transmission apparatus of the present invention, the comparison result of the message transmission cost with the condition acquirement cost by the third cost comparison means is transmitted to the transmission destination. Moreover, since the condition acquirement means acquires the new condition, the total cost is reduced.

To attain the above-described object, according to the present invention, there is provided a second transmission apparatus comprising: input means to which a message is inputted;

transmission means for transmitting the message inputted to the input means;

fourth cost comparison means for obtaining and comparing a message transmission cost with an intermediary cost incurred if the message is relayed by an intermediary apparatus for relaying the message; and second transfer means for transferring the comparison result by the fourth cost comparison means to the intermediary apparatus.

According to the second transmission apparatus of the present invention, the comparison result of the message transmission cost with the intermediary cost by the fourth cost comparison means is transmitted to the intermediary apparatus. Therefore, the intermediary apparatus can select a more cost-effective method.

To attain the above-described object, according to the present invention, there is provided a selection intermediary program storage medium which stores a selection intermediary program comprising: reception means for receiving a message transmitted from a transmission apparatus for transmitting the message;

output means for selecting and outputting the message received by the reception means on a predetermined condition;

condition generation means for generating a condition more moderate than the selection condition based on the selection condition by the output means; and advertisement means for applying the condition generated by the condition generation means to the transmission apparatus, and requesting the transmission apparatus to select and transmit the message on the condition.

To attain the above-described object, according to the present invention, there is provided a first transmission program storage medium which stores a transmission program comprising: input means to which a message is inputted;

transmission means for selecting and transmitting the message inputted to the input means;

condition acquirement means for acquiring a condition of selection by the transmission means from the transmission destination of the transmission means;

third cost comparison means for comparing a necessary transmission cost incurred if the message inhibited from being transmitted is transmitted as a result of the selection by the transmission means, with an acquirement cost necessary for acquiring the condition by the condition acquirement means; and first transfer means for transferring the comparison result by the third cost comparison means to the transmission destination.

To attain the above-described object, according to the present invention, there is provided a second transmission program storage medium which stores a transmission program comprising: input means to which a message is inputted;

transmission means for transmitting the message inputted to the input means;

fourth cost comparison means for obtaining and comparing a message transmission cost with an intermediary cost incurred if the message is relayed by an intermediary apparatus for relaying the message; and second transfer means for transferring the comparison result by the fourth cost comparison means to the intermediary apparatus.

Additionally, for the selection intermediary program of the present invention, only the basic form is described herein to avoid redundancy, and the selection intermediary program of the present invention includes not only the above-described basic form of the selection intermediary program but also various forms of selection intermediary programs for the above-described forms of the selection intermediary apparatus.

Moreover, for the selection intermediary apparatus and transmission apparatus, and the selection intermediary program and transmission program of the present invention, as the names of constituting elements, the same appellations are used such as the reception means and the transmission means. However, in the selection intermediary apparatus and transmission apparatus, a combination of software and hardware performing such action is indicated, and in the selection intermediary program and transmission program, only the software part performing the action is indicated.

As described above, according to the present invention, the intermediary system cost can be reduced.

DETAILED DESCRIPTION OF THE PREFERRED EMBODIMENTS

An embodiment of the present invention will be described hereinafter. In the present embodiment, one type of the above-described agent is provided with a function as one embodiment of the selection intermediary apparatus of the present invention, and a function as one embodiment of the transmission apparatus of the present invention. When the agent of the present embodiment functions as the above-described server-side agent, the function as the embodiment of the selection intermediary apparatus of the present invention is fulfilled. Moreover, when the agent of the present embodiment functions as the above-described client-side agent, the function as the embodiment of the transmission apparatus of the present invention is fulfilled.

Figure 1:
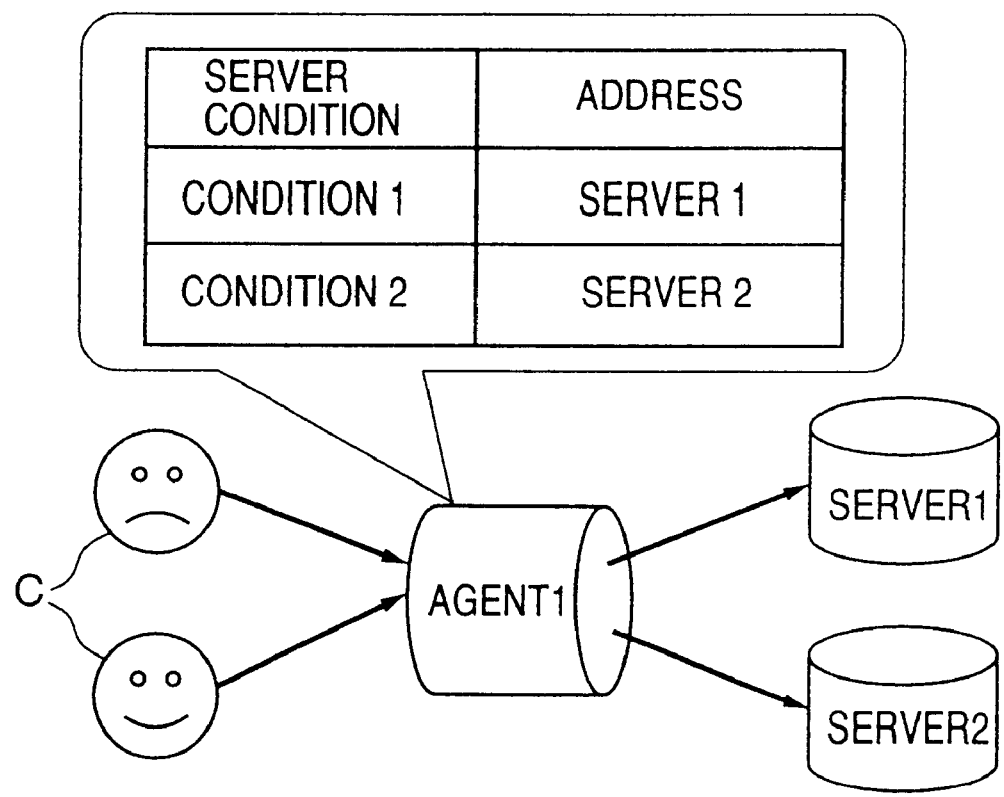
FIG. 1 is a schematic view of an intermediary system by a single agent.
Figure 2:
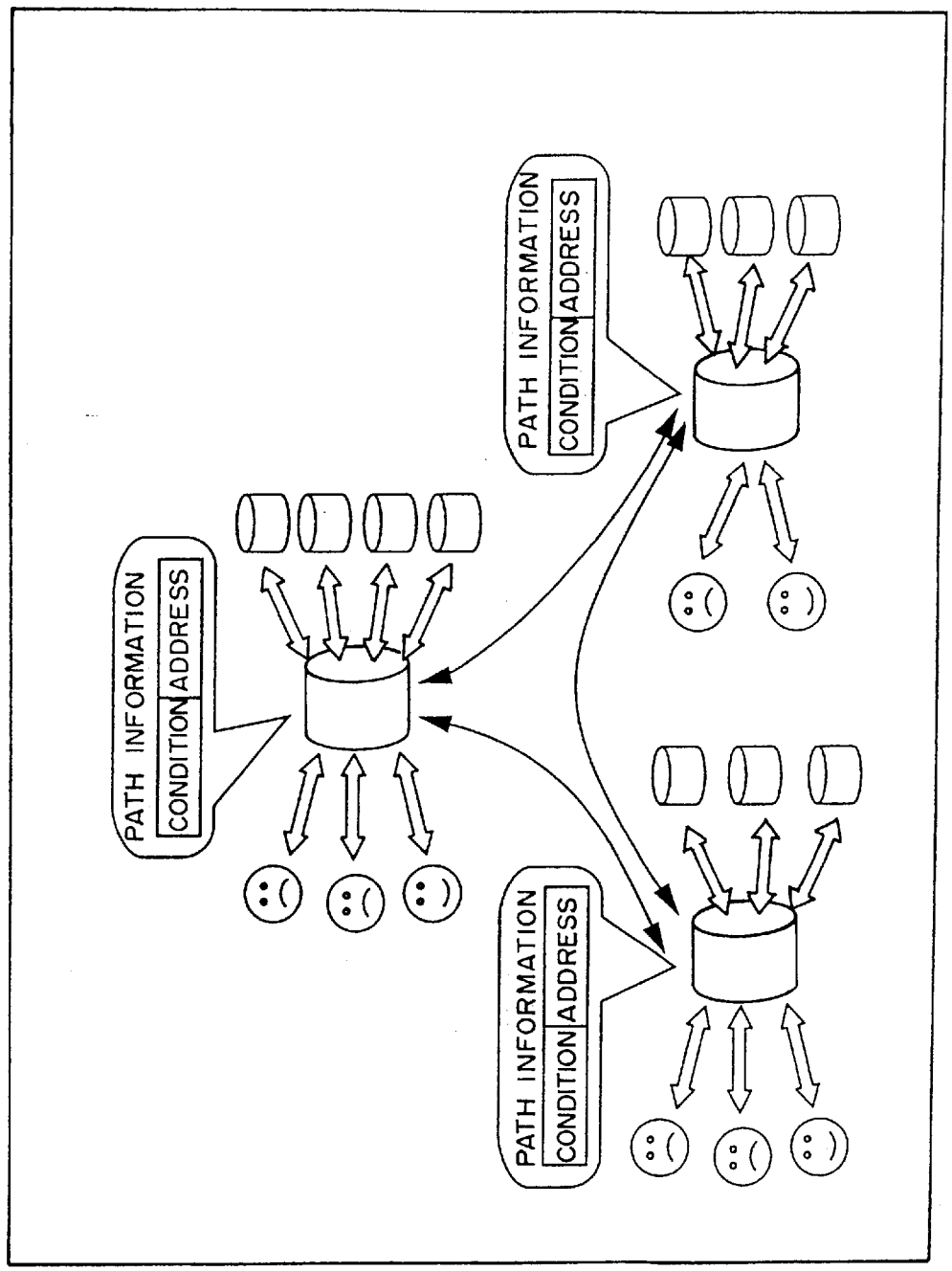
FIG. 2 is a schematic view of the intermediary system by a plurality of agents.
Figure 3:
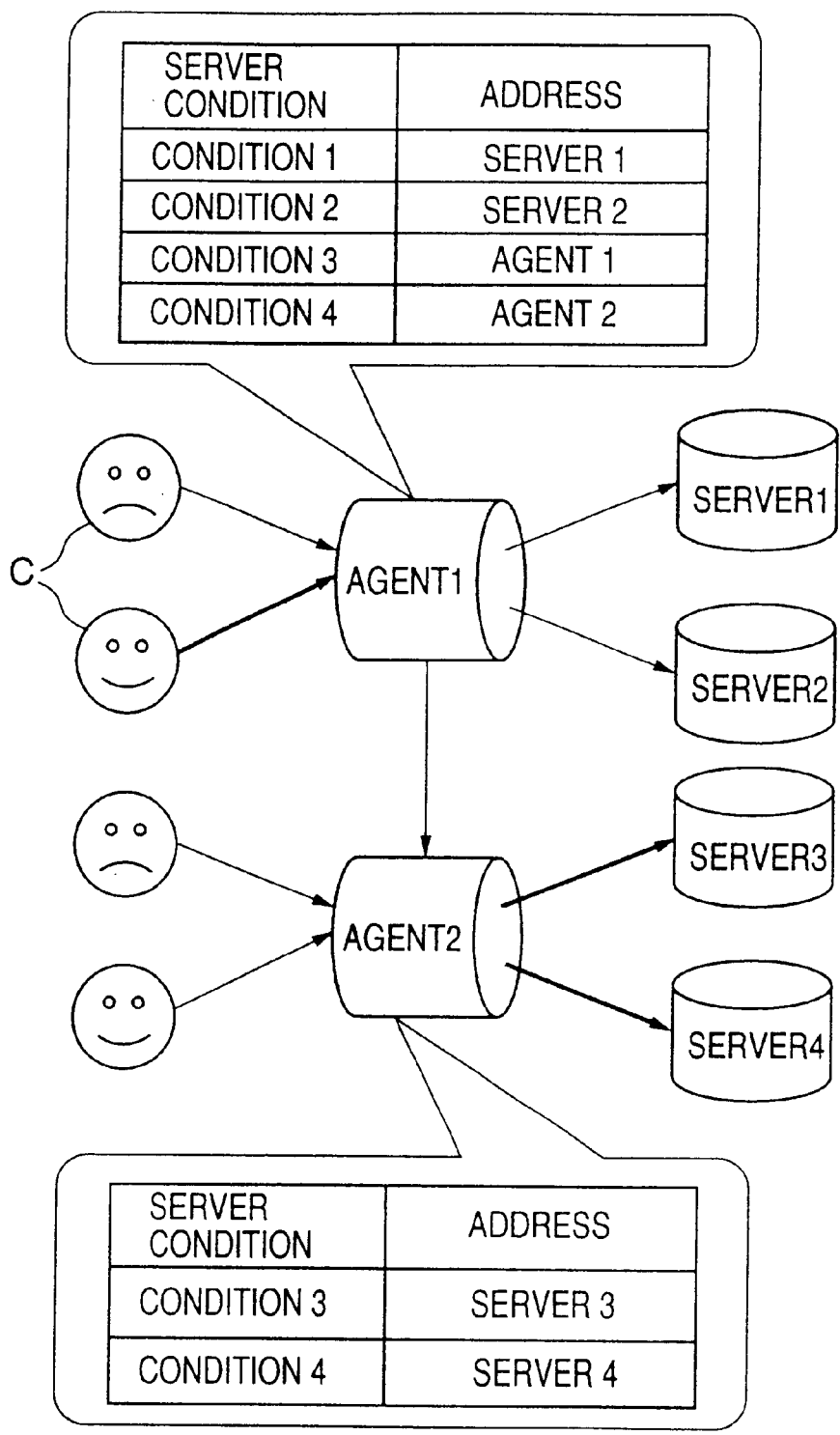
FIG. 3 is an explanatory view of an advertisement system.
Figure 4:
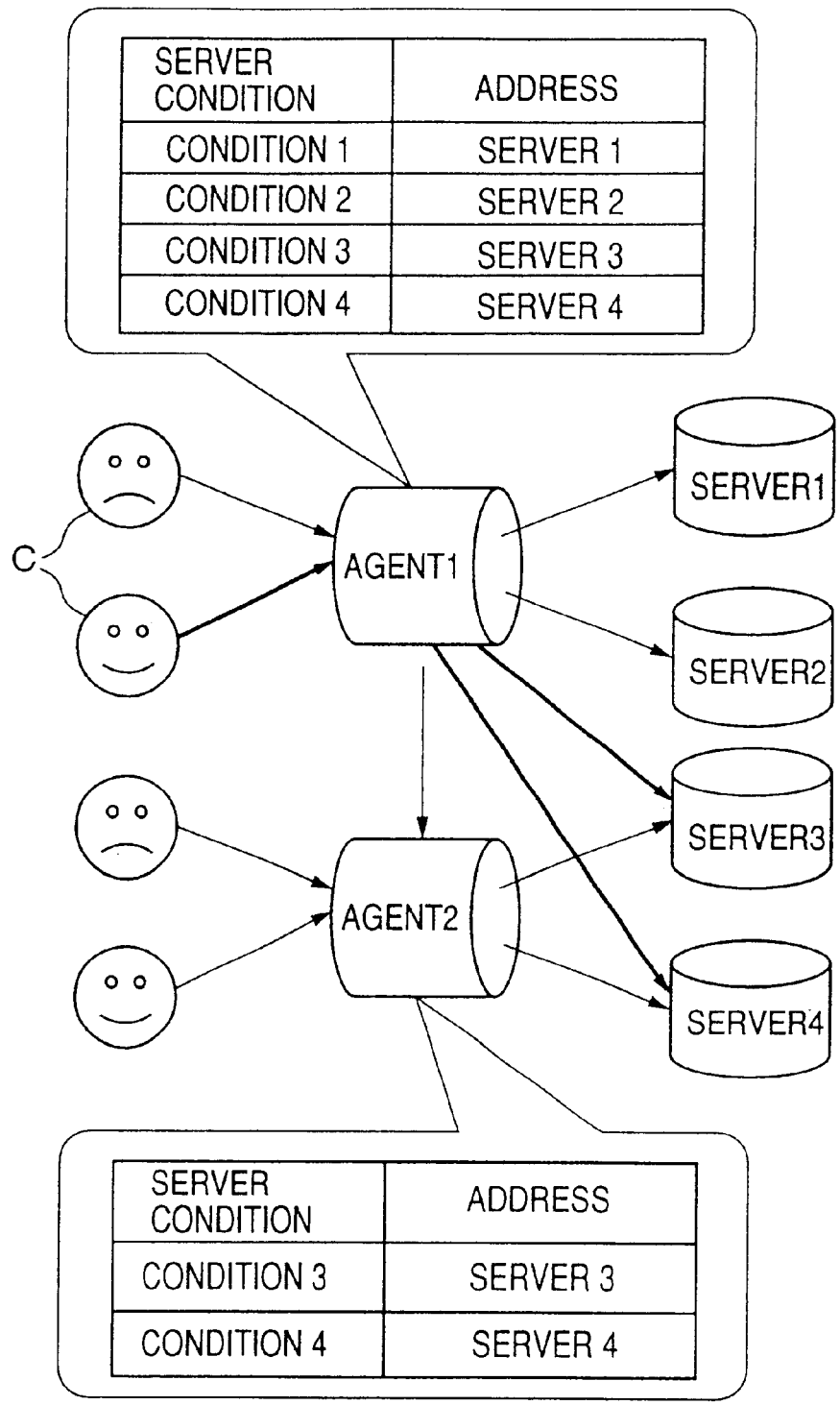
FIG. 4 is an explanatory view of a replication system.
Figure 5:
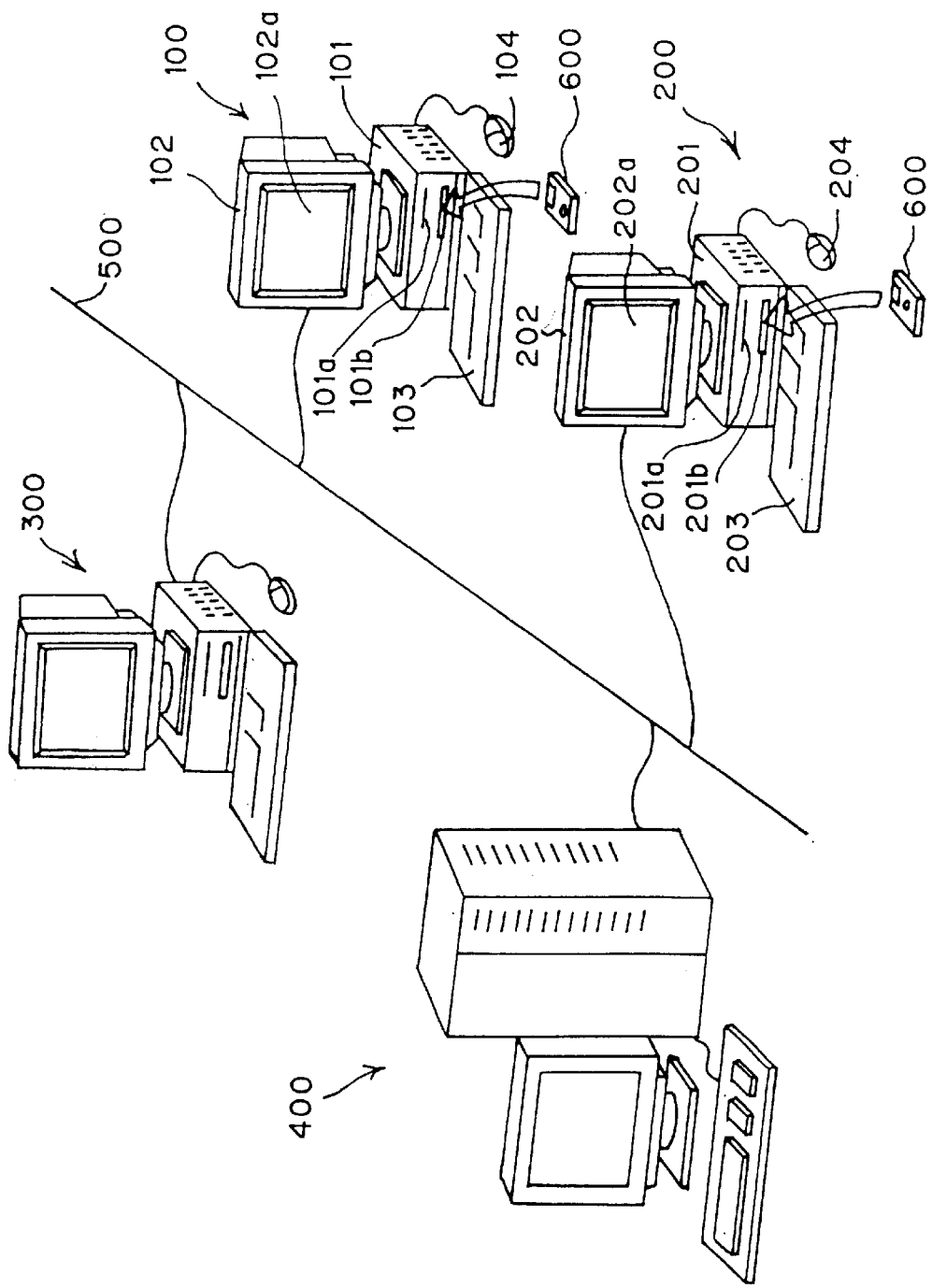
FIG. 5 is a view showing the intermediary system constituted by the agent of the present embodiment.

FIG. 5 is a view showing the intermediary system constituted by the agent of the present embodiment.

In FIG. 5, computers constitute two agents 100, 200, one client 300, and one server 400, respectively. The agent 100 or 200 is a high-rate large-capacity computer called a workstation, and is operated by an agent manager. The client 300 is a so-called personal computer, and is operated by a user. These computers 100, 200, 300, 400 are connected to one another by a communication network 500 to constitute an intermediary system. Additionally, for two agents 100, 200, one client 300, and one server 400 shown in FIG. 5, the agents, and the like constituting the intermediary system are representatively shown, and the following description is sometimes on the assumption that the intermediary system includes a plurality of servers without being particularly mentioned.

Two agents 100, 200 have the same function, but here the client 300 sends a message to the agent 100, and as a result, the agent 100 functions as the client-side agent. Moreover, the server condition and address of the server 400 are registered as initial path information in the agent 200, and as a result, the agent 200 functions as the server-side agent.

The computer constituting the agent 100, or 200 is provided with: a main body 101, 201 incorporating CPU, RAM memory, magnetic disk, communication board, and the like; a CRT display 102, 202 which performs screen display in accordance with instructions from the main body; a keyboard 103, 203 for inputting the manager instruction and character information to the computer; and a mouse 104, 204 for designating an arbitrary position on the display screen of the CRT display 102, 202 to input the instruction for the position. The main body 101, or 201 includes, on appearance, a floppy disk mounting port 110a, 201a or MO mounting port 101b, 201b to which a floppy disk or MO (magnetic optical disk) 600 is extractably inserted, and incorporates inside a floppy disk driver, or an MO driver for driving the inserted floppy disk, or MO 600.

Here, the floppy disk stores an agent program including the selection intermediary program and transmission program of the present invention, the floppy disk is inserted into the main body 101, 201 via the floppy disk mounting port 110a, 201a, and the floppy disk driver installs the agent program stored in the floppy disk into the magnetic disk of the computer system. When the agent program installed in the magnetic disk of the computer system starts, the computer system operates as the agent provided with the functions of the selection intermediary apparatus and transmission apparatus of the present invention.

Therefore, the floppy disk with the agent program stored therein embodies both the selection intermediary program storage medium and the transmission program storage medium of the present invention.

Moreover, the agent program stored in the floppy disk is installed in the magnetic disk of the computer system as described above, and the magnetic disk with the agent program installed therein also embodies both the selection intermediary program storage medium and the transmission program storage medium of the present invention.

Furthermore, when the agent program is downloaded to the MO 600, or the like, the MO 600 with the downloaded agent program stored therein also embodies both the selection intermediary program storage medium and the transmission program storage medium of the present invention.

The hardware constitution of the above-described representative agent 100 will be described hereinafter.

Figure 6:
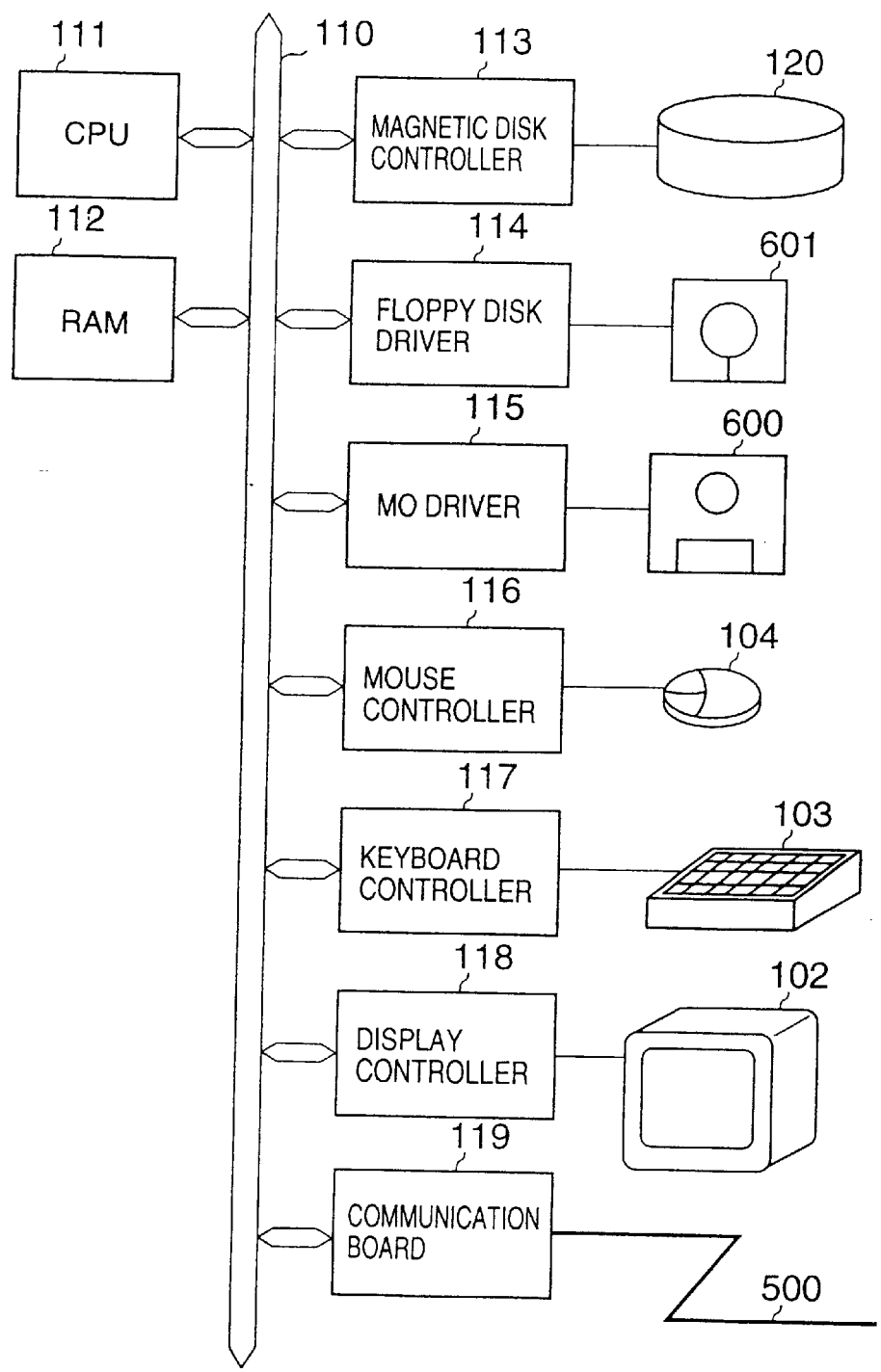
FIG. 6 is a block diagram showing agent hardware.

FIG. 6 is a block diagram of the agent hardware.

This hardware block diagram shows a central processing unit (CPU) 111, a RAM 112, a magnetic disk controller 113, a floppy disk driver 114, an MO driver 115, a mouse controller 116, a keyboard controller 117, a display controller 118, and a communication board 119, and these components are connected to one another via a bus 110.

As described with reference to FIG. 5, the floppy disk driver 114, and the MO driver 115 are provided with a floppy disk 601 and MO 600, respectively, to access the inserted floppy disk 601 and MO 600.

Moreover, FIG. 6 also shows the magnetic disk 120 accessed by the magnetic disk controller 113, the mouse 104 controlled by the mouse controller 116, the keyboard 103 controlled by the keyboard controller 117, the CRT display 102 controlled by the display controller 118, and the communication network 500 connected via the communication board 119.

As described above, the agent program is stored in the floppy disk 601, read from the floppy disk 601 by the floppy disk driver 114, transmitted via the bus 110, and stored in the magnetic disk 120 by the magnetic disk controller 113. For actual execution, the agent program in the magnetic disk 120 is loaded onto the RAM 112, and executed by the CPU 111.

The function of the agent will be described hereinafter. The agent 100, or 200 shown in FIG. 5 functions as both the client-side agent and the server-side agent, and can simultaneously fulfill the functions, but in the following description, the function as the client-side agent is described separately from the function as the server-side agent for the sake of convenience.

Figure 7:
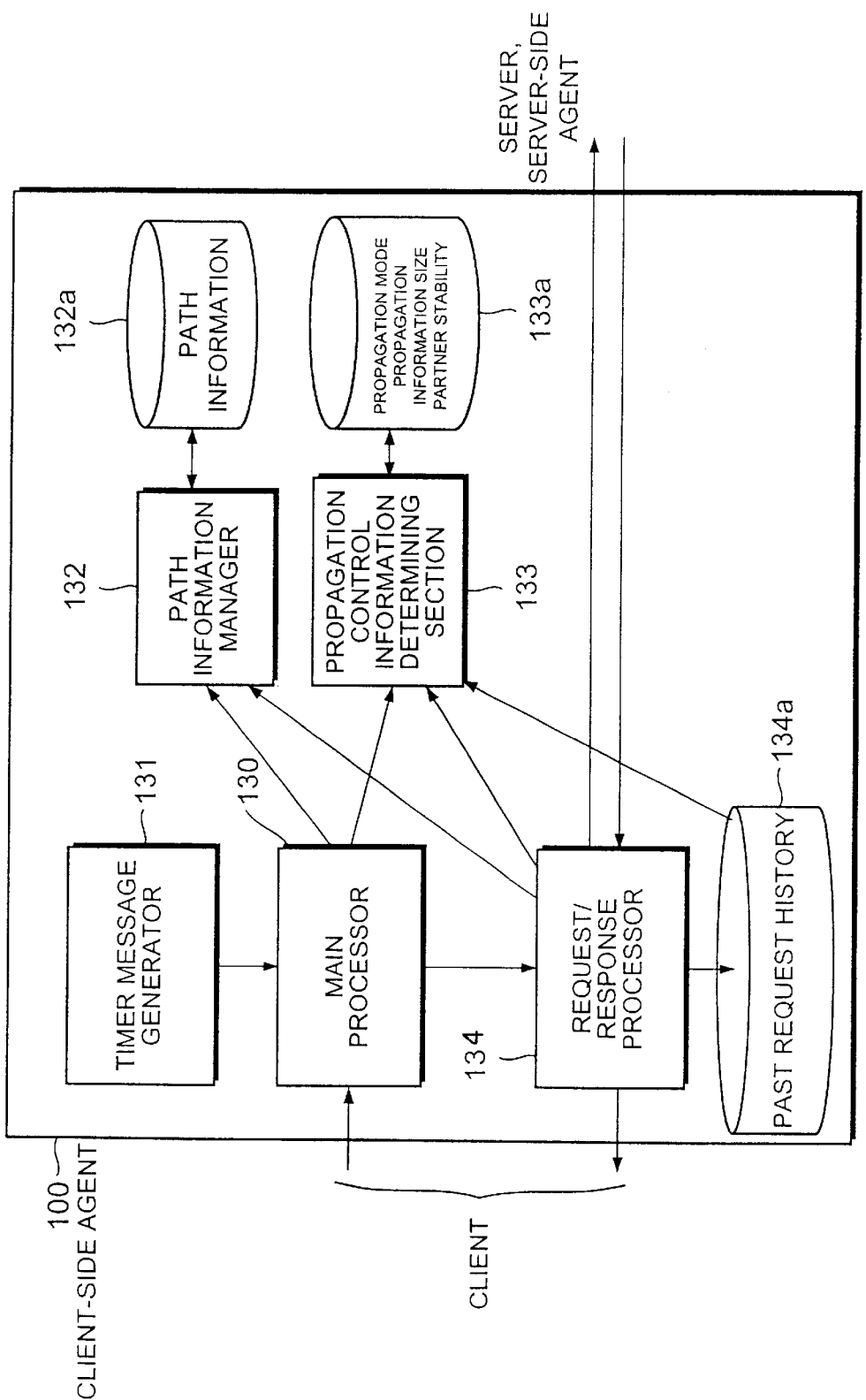
FIG. 7 is a functional block diagram of a client-side agent.

FIG. 7 is a functional block diagram of the client-side agent.

The client-side agent 100 is constituted of a main processor 130, a timer message generator 131, a path information manager 132, a propagation control information determining section 133, and a request/response processor 134, and stores path information 132a, propagation control information 133a, and past request history 134a. Here, the propagation control information 133a includes a propagation mode indicating the advertisement system or the replication system for propagating the path information, the propagation information size indicating the upper limit of the data size of the path information to be propagated, and stability indicating the degree to which the server-side agent is stable as a communication partner.

As described above, in the system in which a large number of servers and agents are connected, it is contemplated that the disconnection of the servers from the system, or the interruption of the communication network for connecting the servers, and the like frequently occurs. Specifically, as seen from a certain agent, there is a possibility that the existence of the agent as the communication partner is unstable. Moreover, when the path information is exchanged with the unstable partner, the request transfer path indicated by the path information is possibly interrupted. Therefore, in the present embodiment, by estimating the stability indicating the degree to which the communication partner is stable, and holding the path information only for a period in accordance with the estimated stability, the path information indicating the interrupted request transfer path is prevented from remaining.

The stability of the other agent as seen from the certain agent is basically determined by the possibility of success in connection.

For example, when the other agent is incorporated on a notebook personal computer to act as intermediary for the access to the client or the server on the personal computer, and as a result, the agent is frequently disconnected from the network, when the other agent is connected via a very congested and unstable communication network, or when the slow processing of the other agent frequently results in time-out, there is a possibility that the communication with the partner agent is unsuccessful. Therefore, in these cases, it is preferable to estimate the partner stability to be low.

Moreover, it is preferable to update the stability of the partner agent based on the communication history with the partner. For example, when the communication with the partner only has a short history, there is a possibility that the partner is an unstable existence, and the stability of the partner is therefore estimated to be low. Thereafter, every time the communication is normally processed, the stability is re-estimated to be higher. Conversely, when the communication is unsuccessful, the stability is re-estimated to be lower.

The propagation control information 133a shown in FIG. 7 includes the stability estimated in this manner.

The main processor 130 distributes the messages sent from the client, timer message generator 131 and server-side agent to the path information manager 132, propagation control information determining section 133, and request/response processor 134.

The timer message generator 131 periodically issues a timer message which gives a cue to update the propagation control information 133a.

The path information manager 132 performs the registration, reference, deletion and the like of the path information 132a send from the server-side agent.

Additionally, the present embodiment is on the assumption that a server condition form satisfies the following two respects. Specifically:

(1) the condition is constituted by connecting several terms corresponding to the individual conditions of the present invention; and (2) the establishment of the entire condition depends on the simultaneous establishment of a plurality of terms (AND), the establishment of some of the terms (OR), and the representation of the combination.

Since this form can be converted to a logical representation, in the description of the present embodiment, all the server conditions are represented using the logical representation. Additionally, the server condition can semantically be converted to the logical representation, and the actual notation does not have to be the logical representation.

Moreover, as described above, the path information owned by the certain agent is constituted of a group of rules as sets of the server condition and address. The rule is represented, for example, as follows.

Condition A AND Condition B→Server 1

Here, the left side of "→" denotes the server condition, and "Condition A", "Condition B" denote the above-described terms. Moreover, the right side of "→" denotes the address.

Additionally, the rule

Condition A OR Condition B→Server 1 has an effect equivalent to that of the group of the following two rules.

Condition A→Server 1

Condition B→Server 1

Therefore, the rule having the server condition including "OR" is hereinafter disassembled to a plurality of rules and represented. Specifically, the server condition is hereinafter treated such that connection is performed only via "AND".

The propagation control information determining section 133 shown in FIG. 7 manages the propagation control information 133a to perform the switch of the propagation mode, the adjustment of the propagation information size, and the change of the stability. In the present embodiment, the propagation mode is dynamically selected based on the cost comparison as described later.

The request/response processor 134 receives a request from the client, transfers the request to the appropriate server or the server-side agent based on the path information 132a, and returns all the responses obtained from the transfer destination server to the client.

Figure 8:
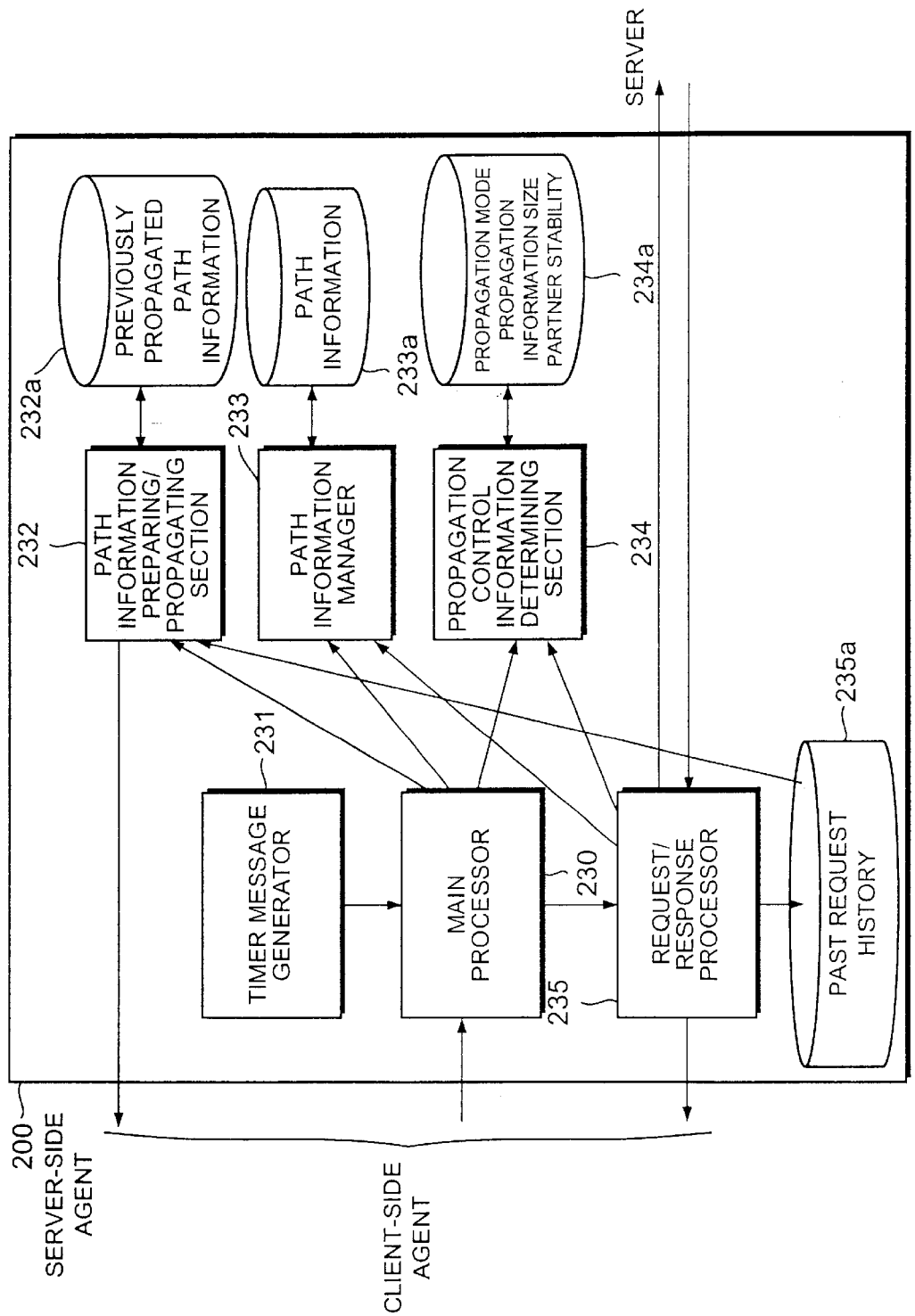
FIG. 8 is a functional block diagram of a server-side agent.

FIG. 8 is a functional block diagram of the server-side agent.

The server-side agent 200 is constituted of a main processor 230, a timer message generator 231, a path information preparing/propagating section 232, a path information manager 233, a propagation control information determining section 234, and a request/response processor 235, and stores previously propagated path information 232a, path information 233a used by itself during transfer of the request, propagation control information 234a and past request history 235a.

The main processor 230 distributes the messages sent from the client-side agent and timer message generator to the propagation control information determining section 234, and request/response processor 235.

The path information preparing/propagating section 232 prepares and propagates the path information to be propagated to the client-side agent.

The timer message generator 231, path information manager 233, propagation control information determining section 234, and request/response processor 235 correspond to the timer message generator 131, path information manager 132, propagation control information determining section 133, and request/response processor 134 of the client-side agent 100 shown in FIG. 7, respectively.

Figure 9:
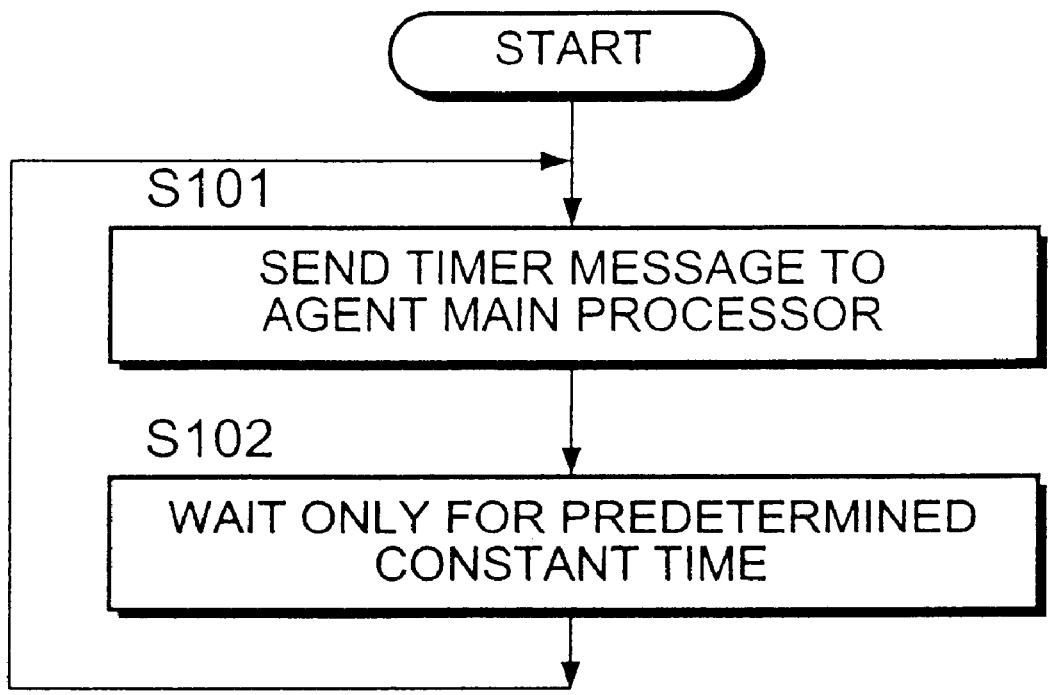
FIG. 9 is a flowchart of a timer message generator.

FIG. 9 is a flowchart of the timer message generator shown in FIGS. 7 and 8.

The timer message generator repeatedly sends the timer message giving a cue to update the propagation control information 133a, 234a to the main processor 130, 230 (step S101), and waits only for a predetermined time (step S102). By the repetition, the propagation control information 133a, 234a are periodically reviewed.

Figure 10:
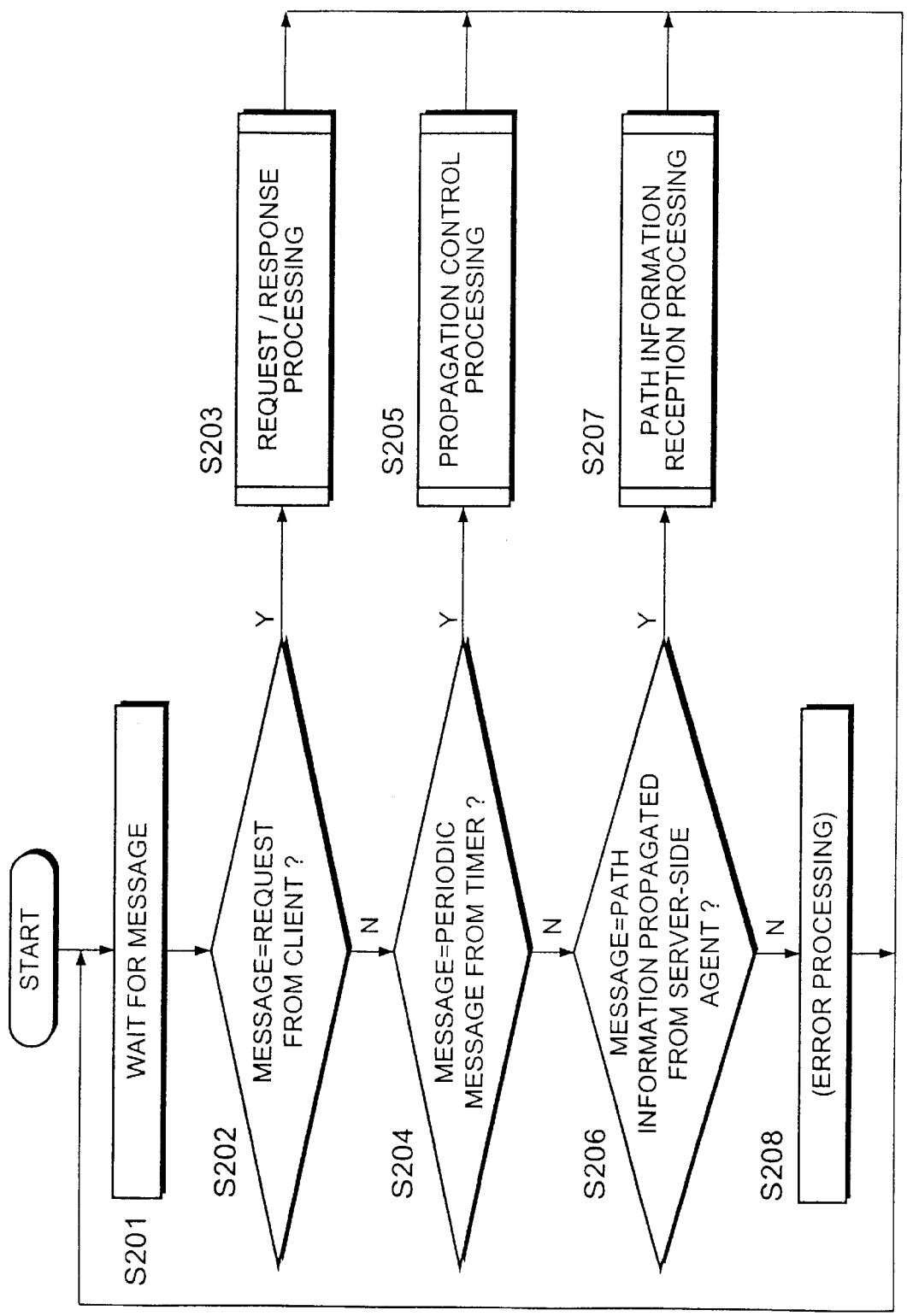
FIG. 10 is a flowchart of the main routine of the client-side agent.

FIG. 10 is a flowchart of the main processor 130 of the client-side agent 100 shown in FIG. 7, and corresponds to the main routine of the client-side agent 100.

The main processor 130 waits until the message is sent from the client (step S201), and distributes the sent message as follows. Specifically, when the message is a request sent from the client (step S202: Y), the message is allotted to the request/response processor 134, and a request/response processing is executed to transfer the request or return the response (step S203). Moreover, when the sent message is a timer message from the timer message generator 131 (step S204: Y), the message is allotted to the propagation control information determining section 133, and a propagation control processing is executed to review the propagation mode, propagation information size, and the like (step S205). Furthermore, when the sent message is path information from the server-side agent (step S206: Y), the message is allotted to the path information manager 132, and a path information reception processing is executed to receive the path information (step S207).

When the sent message is not either one of these three messages, an error processing is executed (step S208), thereby returning to the step of waiting for the message (step S201).

Figure 11:
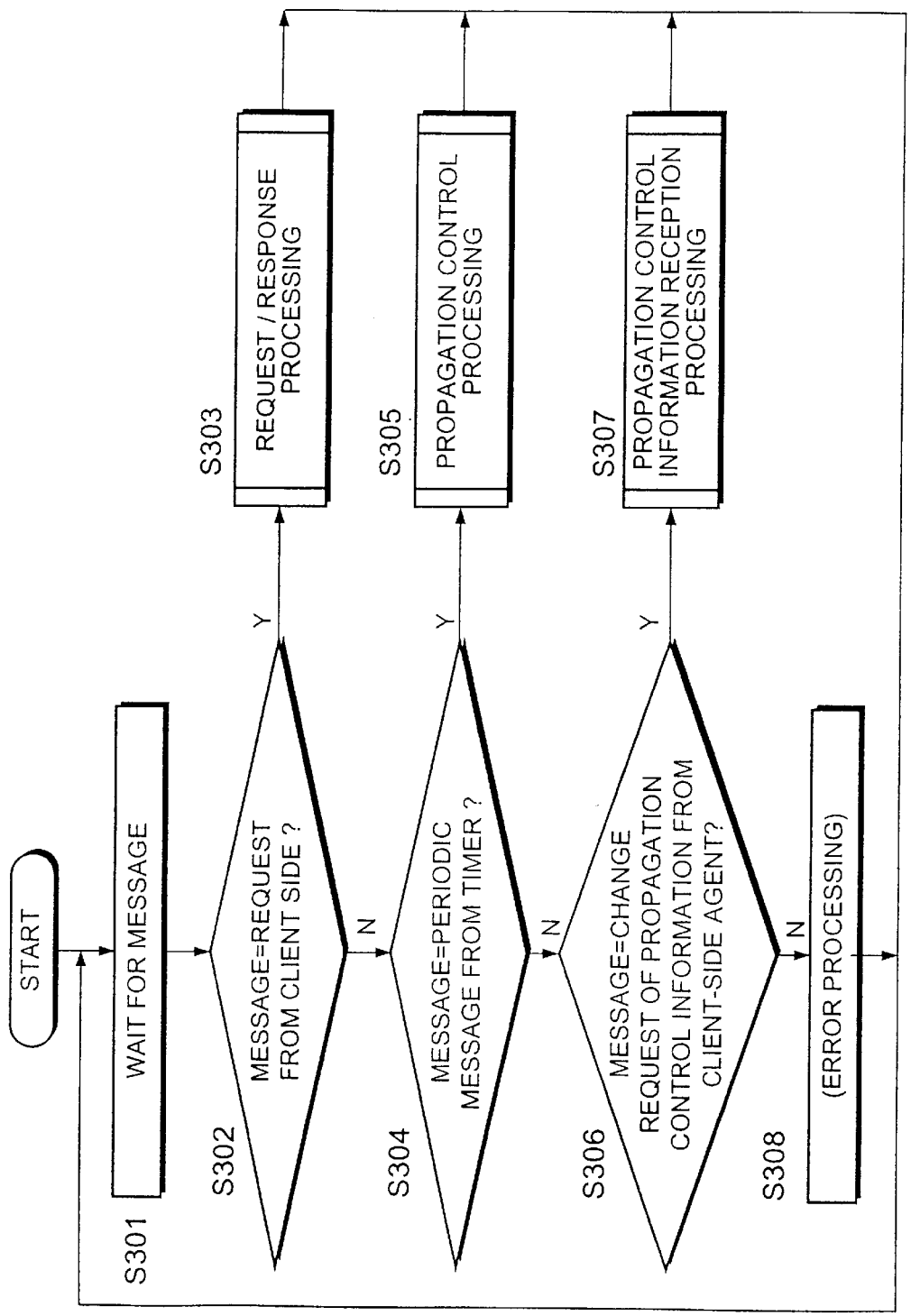
FIG. 11 is a flowchart of the main routine of the server-side agent.

FIG. 11 is a flowchart of the main processor 230 of the server-side agent 200 shown in FIG. 8, and corresponds to the main routine of the server-side agent 200.

The flowchart of the main processor 230 is very similar to the flowchart shown in FIG. 10, and steps S301, S302, S303, S304, S305, S308 shown in FIG. 11 correspond to the steps S201, S202, S203, S204, S205, S208 shown in FIG. 10. However, the detailed contents of the request/response processing of step S303 and propagation control processing of step S305 are slightly different from those of the request/response processing of step S203 and propagation control processing of step S205 shown in FIG. 10. The details of these processings will be described later.

Additionally, when the message sent at the step S301 of FIG. 11 is a change request of propagation control information sent from the client-side agent (step S306: Y), the message is allotted to the propagation control information determining section 234 shown in FIG. 8, and a "reception processing of propagation control information" is executed to accept the change of the propagation control information (step S307).

Figure 12:
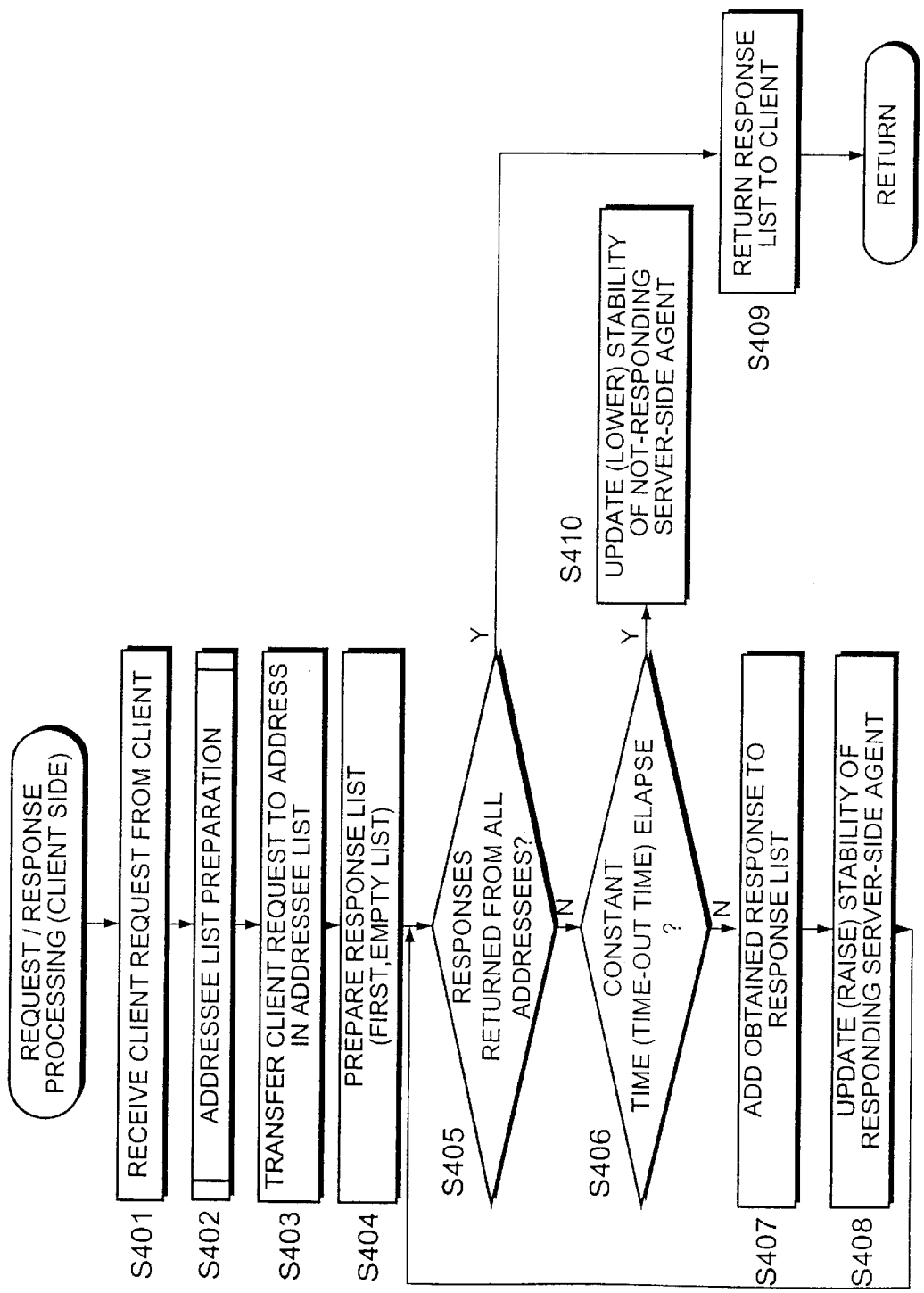
FIG. 12 is a flowchart of a request/response processing executed by the client-side agent.

FIG. 12 is a flowchart of the request/response processing executed by the client-side agent.

The request/response processing is executed at step S203 when it is determined in the main routine shown in FIG. 10 that the request from the client is sent (Step S202: Y), and this processing is one example of the transmission means of the present invention.

In this request/response processing, first, the request from the client is received (step S401), a processing of "preparing an addressee list" is executed to prepare the list of addresses (addressees) of the servers or the server-side agents, which does not contradict the client designated condition included in the request from the client (step S402), and the request is transferred to the address indicated in the addressee list (step S403).

Thereafter, an empty response list is prepared (step S404), a response from the server-side agent reaches within a time-out time (step S406: N), the response is then added to a response list (step S407), and the stability of the server-side agent having sent the response is raised (step S408). When the responses are returned from all the addressees (step S405: Y), the responses are listed, and returned to the client (step S409).

When the time-out time elapses before obtaining all the responses (step S406: Y), the stability of the server-side agent from which no response is obtained is lowered (step S410), and only the obtained responses are listed and returned to the client (step S409).

Figure 13:
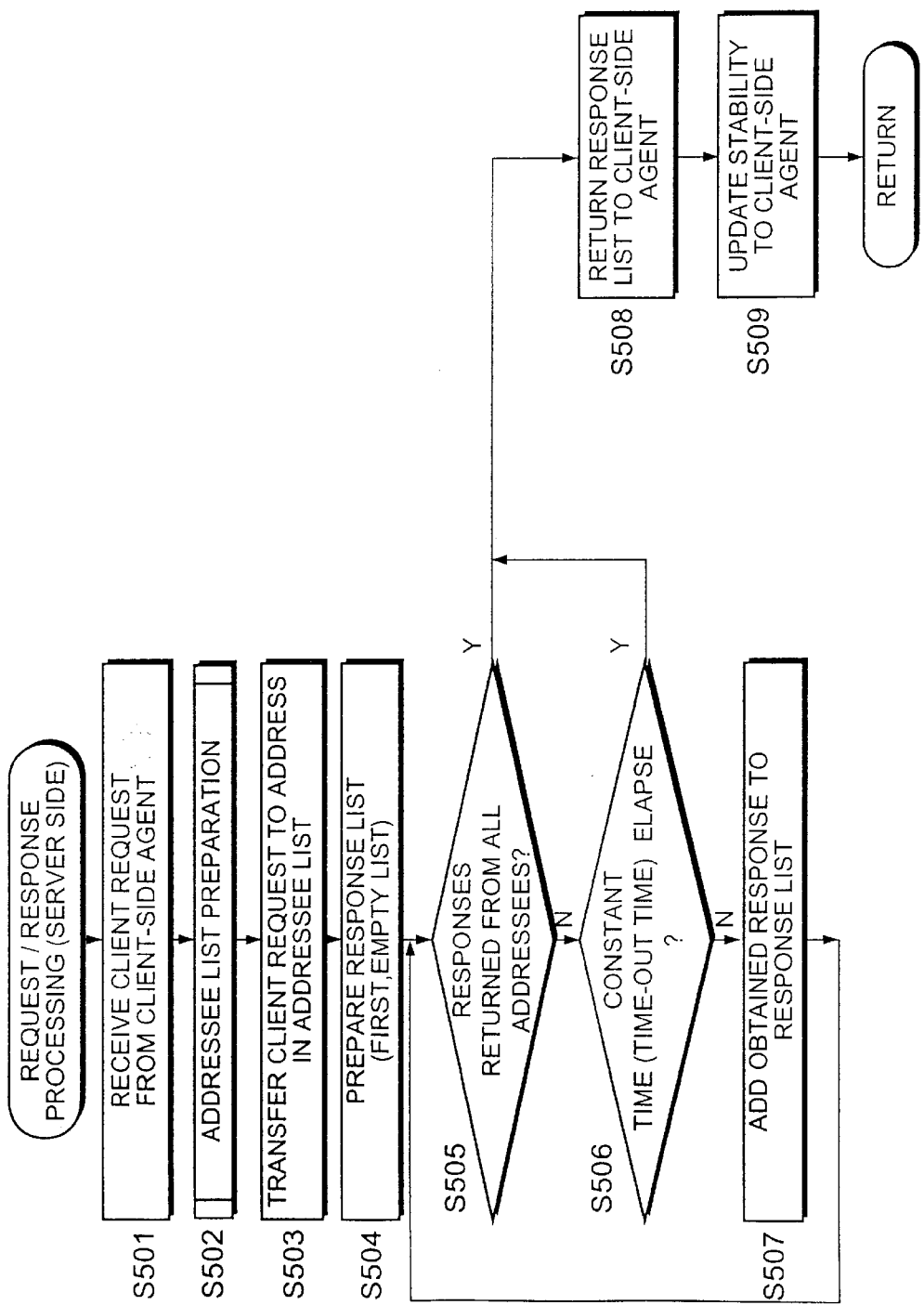
FIG. 13 is a flowchart of the request/response processing executed by the server-side agent.

FIG. 13 is a flowchart of the request/response processing executed by the server-side agent.

This request/response processing is a processing executed at step S303 when it is determined in the main routine shown in FIG. 11 that the request from the client is transferred (Step S302: Y), and this processing is one example of the transmission means of the present invention.

Steps S501 to S508 shown in FIG. 13 correspond to the steps S401 to 407 and step S409 shown in FIG. 12.

When the response list is returned to the client-side agent (step S508), the stability to the client-side agent is updated (step S509).

Figure 14:
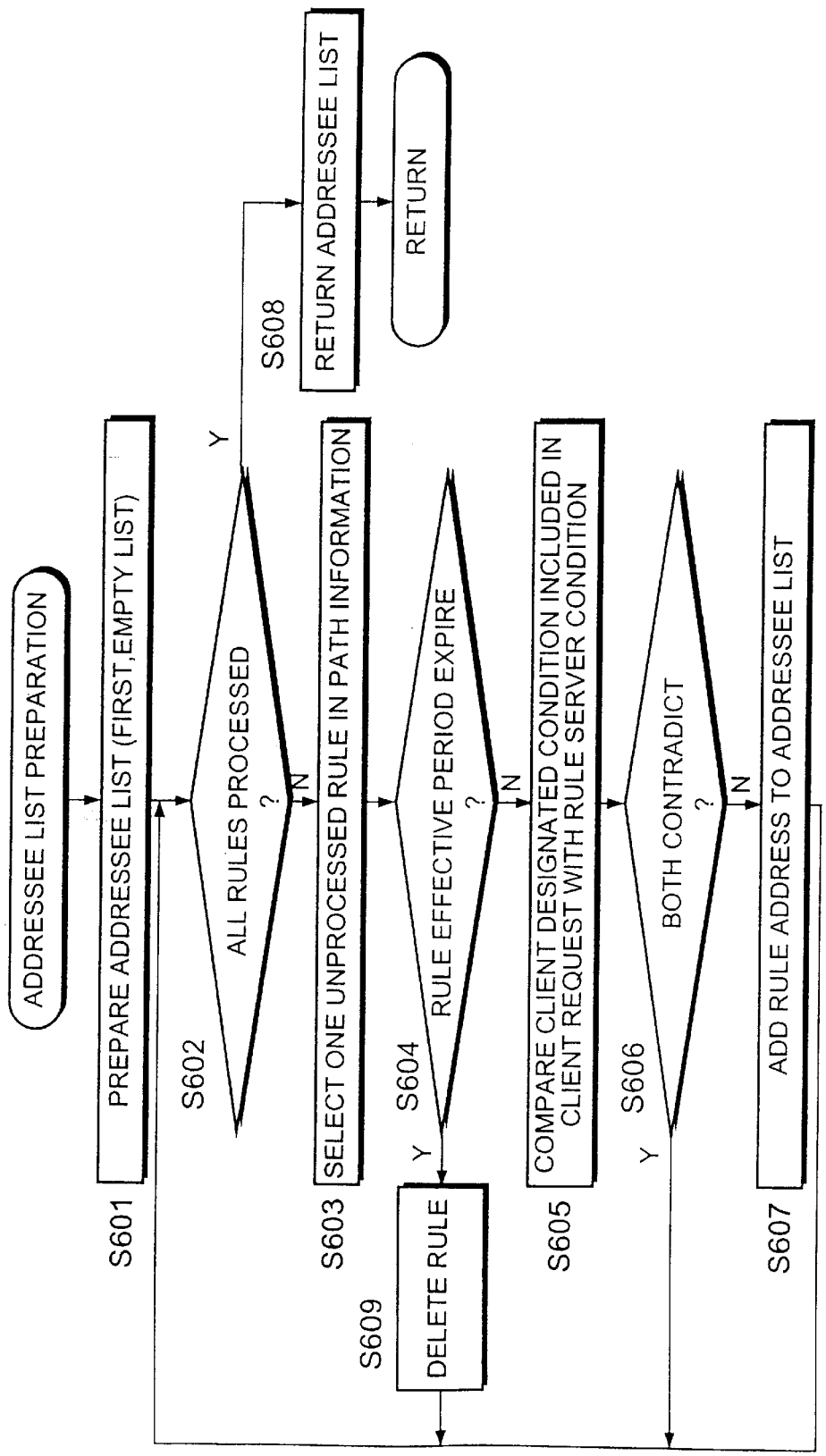
FIG. 14 is a flowchart of an addressee list preparation processing.

FIG. 14 is a flowchart of an addressee list preparation processing.

This addressee list preparation processing is a processing executed at the request/response processing step S402 of FIG. 12 which is executed at the step S203 when the request from the client is received in the main routine shown in FIG. 10, and at the request/response processing step S502 of FIG. 13 which is executed at the step S303 when the request from the client is received in the main routine shown in FIG. 11.

As described above, the request sent from the client includes the client designated condition in which the client designates the server to send the request, and the addressee list is prepared by, with respect to all the rules of path information, comparing the server condition with the client designated condition included in the rule, and by adding the address included in the rule to the list when the conditions do not contradict each other.

When the "addressee list preparation" processing starts, first, an empty addressee list is prepared (step S601), one unprocessed rule is selected from the path information (step S603), it is judged to be within the effective period of the rule (step S604: N), and the client designated condition included in the request from the client is compared with the server condition of the rule (step S605).

Here, a method of judging whether or not the server condition contradicts the client designated condition will be described.

In the present embodiment, the occurrence of contradiction is determined only when the server condition explicitly contradicts the client designated condition.

For example, when the server condition is "Condition A", and the client designated condition is negative, that is, not (Condition A), both conditions explicitly contradict each other. In this case, it is judged that contradiction occurs.

Moreover, for example, when the server condition is "Condition A", and the client designated condition is "Condition A AND Condition B", term "Condition B" is not explicitly included in the server condition, and the term "Condition B" is therefore simply ignored. Moreover, since the terms "Condition A" explicitly agree with each other, it is judged that the server condition fails to contradict the client designated condition.

Therefore, the condition having no term does not contradict any condition.

This judging method is a preferable judging method in the intermediary system in which the request is sent to all the servers possibly presenting the responses desired by the user and the responses are collected as many as possible. However, this judging method is one example, and other judging methods can be employed.

Moreover, the respective terms constituting the server condition are associated with the effectiveness indicating the degree to which the terms contradicting the client designated condition are useful for the reduction of the request transfer amount, and the effectiveness of each term is updated every time the server condition is compared with the client designated condition. As a result, the effectiveness of the term which contradicts with a frequency higher than a predetermined frequency is raised. Conversely, the effectiveness of the term which contradicts with a frequency lower than the predetermined frequency is lowered.

The server condition is compared with the client designated condition (step S605). As a result, when the conditions do not contradict each other (step S606: N), the address of the rule is added to the addressee list (step S607). When this processing is completed with all the rules (step S602: Y), the addressee list is returned (step S608).

Additionally, when the effective period of the selected rule expires (step S604: Y), the rule is deleted from the path information (step S609).

Figure 15:
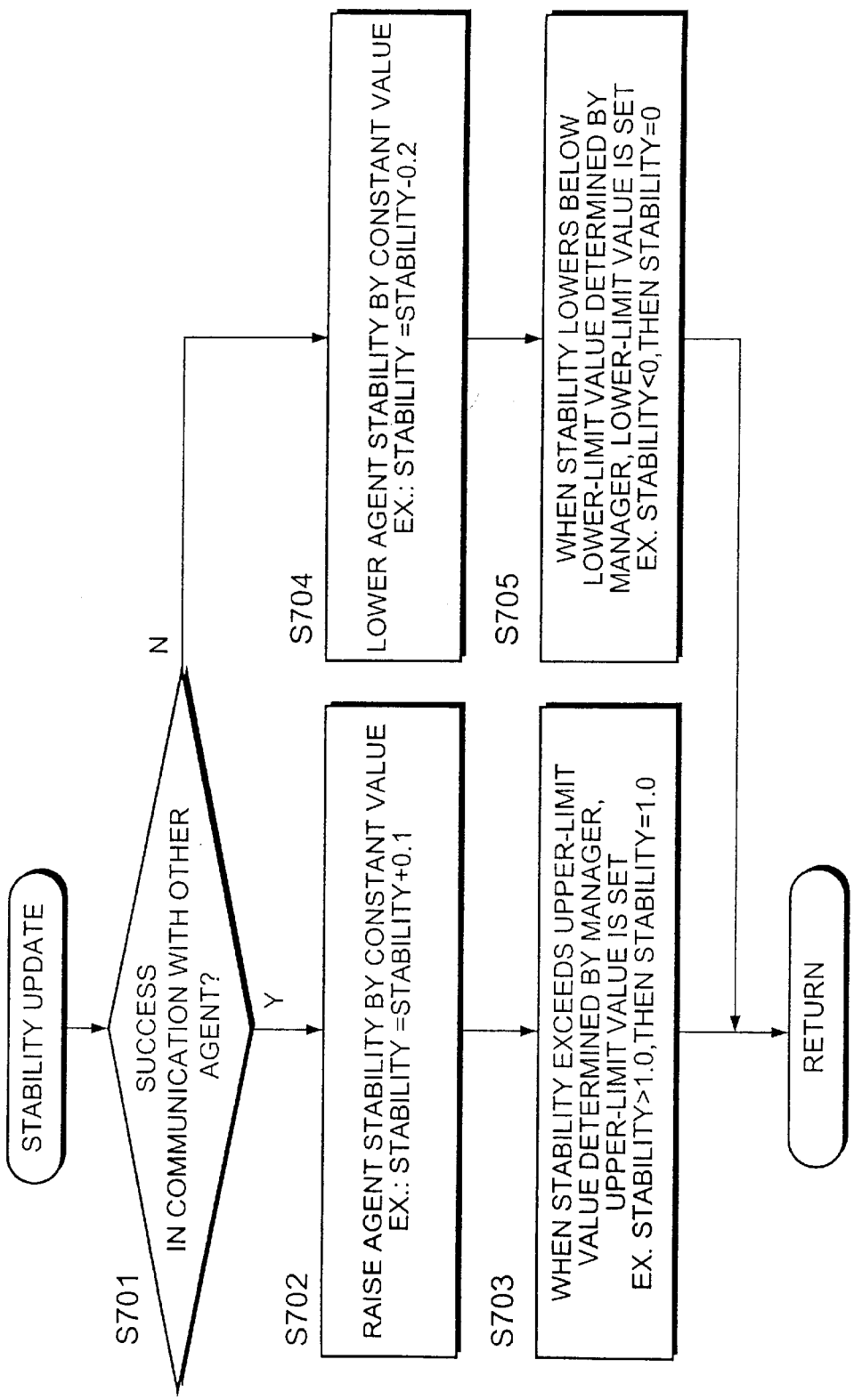
FIG. 15 is a flowchart of a stability update processing.

FIG. 15 is a flowchart of a stability update processing.

This stability update processing is a processing executed at the request/response processing steps S408 and S410 shown in FIG. 12, the request/response processing step S509 shown in FIG. 13, and the like, when the communication with the other agent is successful or unsuccessful in the request/response processing shown in FIGS. 12 and 13 and other processings described later. FIG. 15 shows an update procedure as one example, in which the stability takes either value of "0" to "1".

When the communication with the object agent is successful, the stability of the agent is increased. When the stability exceeds the upper-limit value (e.g., "1.0") determined by a manager, the stability is set to the upper-limit value. Conversely, when the communication with the object agent is unsuccessful, the stability of the agent is decreased. When the stability lowers below the lower-limit value (e.g., "0.0") determined by the manager, the stability is set to the lower-limit value.

Figure 16:
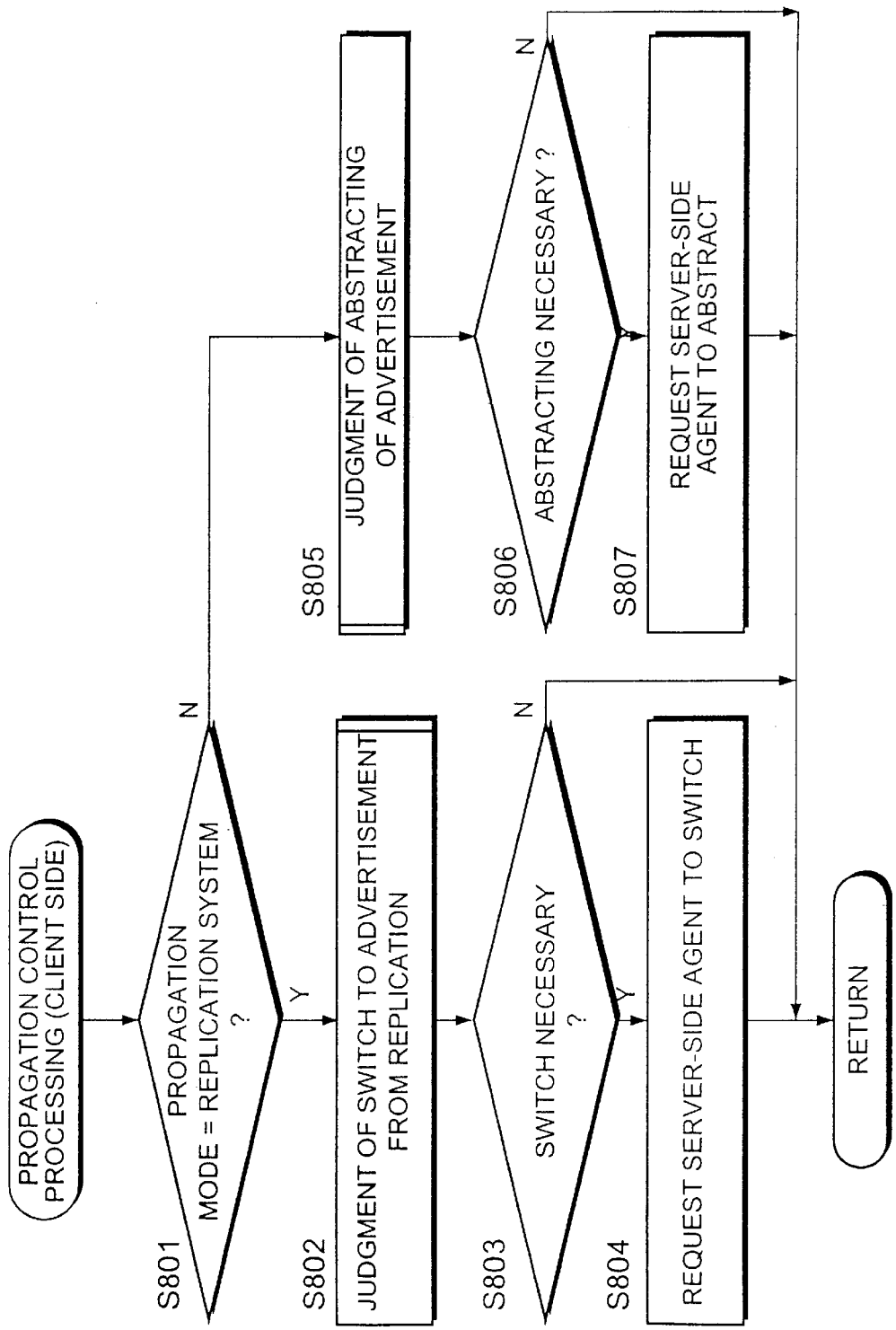
FIG. 16 is a flowchart of a propagation control processing of the client-side agent.

FIG. 16 is a flowchart of a propagation control processing of the client-side agent.

This propagation control processing is executed at step S205 when it is determined in the main routine shown in FIG. 10 that the timer message is received (step S204: Y).

This propagation control processing is performed in accordance with the current propagation mode indicating the advertisement system or the replication system.

When the propagation mode indicates the replication system (step S801: Y), it is judged whether or not the replication needs to be switched to advertisement as described later (step S802). Subsequently, when it is judged that the switching is necessary (step S803: Y), the server-side agent is notified as such (step S804).

On the other hand, when the propagation mode indicates the advertisement system (step S801: N), it is judged whether or not the server condition to be advertised needs to be abstracted as described later (step S805). When it is judged that the abstracting is necessary (step S806: Y), the server-side agent is notified as such (step S807).

Here, the processing of judging whether or not the replication needs to be switched to the advertisement (step S802) is one example of the fourth cost comparison means of the present invention, and the processing of notifying that the switching is necessary (step S804) is one example of the second transmission means of the present invention. Moreover, the processing of judging whether or not the server condition needs to be abstracted (step S805) is one example of the third cost comparison means of the present invention, and the processing of notifying that the abstracting is necessary (step S807) is one example of the first transmission means of the present invention.

Here, a method of dynamically selecting the propagation system of the path information will be described.

However, in the following, the "advertisement system" and "replication system" are sometimes referred to without distinguishing the path information propagation system from the system of transferring the request after propagating the path information.

In the above-described extended advertisement system, the condition more moderate than the server condition owned by the server-side agent can be used as the server condition of the path information propagated to the client-side agent. Therefore, even when the server condition owned by the server-side agent includes the condition which is to be concealed from the other agents, the server conditions excluding the condition can be registered, so that the security of the server condition can be kept. Moreover, in the advertisement system, since the access to the server necessarily passes through the server-side agent, the server-side agent can check the access, which can alleviate the burden of the access check in the server.

On the other hand, in the replication system, since the server condition owned by the server-side agent needs to be copied as it is, it is not permissible to conceal a part of the server condition in an unopened manner. Moreover, since the server address also needs to be copied, the individual servers connected to the server-side agent are all open to the public. Furthermore, in the replication system, since the client-side agent directly transfers the request to the server, a system in which the server-side agent controls all accesses to the server cannot be constituted. Therefore, the server needs to perform a strict access control, and the burden of the access check is heavy in the server.

As described above, the advertisement system is far different from the replication system in the limitation of the open range of the path information, the access control, and other respects. Therefore, in order to secure the information security, the replication system is inappropriate, and there is not any other choice than the advertisement system. However, when there is no problem of security, it is preferable to select a cost effective system, and the guideline or algorithm for dynamically selecting either one of both systems is demanded.

In the advertisement system, the request from the client is transferred to the server via both the client-side agent and the server-side agent. Therefore, the passing through both the agents generates a delay, which generates a delay cost. On the other hand, in the replication system, since the request is directly transferred to the server from the client-side agent, the transfer delay and delay cost are suppressed. The replication system is advantageous in respect of the delay cost in this manner.

However, on the other hand, when the same request is sent to a large number of servers, the advertisement system in which one request is once sent to the server-side agent and then transferred to the respective servers is sometimes lower in transfer cost than the replication system in which the individual requests are transferred to the respective servers from the client-side agent. Specifically, in respect of the transfer cost, the replication system is more advantageous than the advertisement system in some cases. Particularly, when the client-side agent is far from the server, and the server-side agent is close to the respective servers, in the advertisement system in which the same request is once transferred between the agents far from each other, a higher-rate lower-cost transfer can be expected than that of the replication system.

Since the advertisement to propagate the most detailed server condition and the replication to copy the server condition have the same data size of the path information, there is little difference of the propagation cost of the path information. Therefore, by comparing the request transfer cost in the advertisement system in which the advertisement of propagating the most detailed server condition with the request transfer cost in the replication system, the effect of sending a group of requests in the advertisement system is compared with the effect of the decrease of the agents engaged in the transfer by one in the replication system.

A concrete cost comparison method will be described hereinafter.

Figure 17:
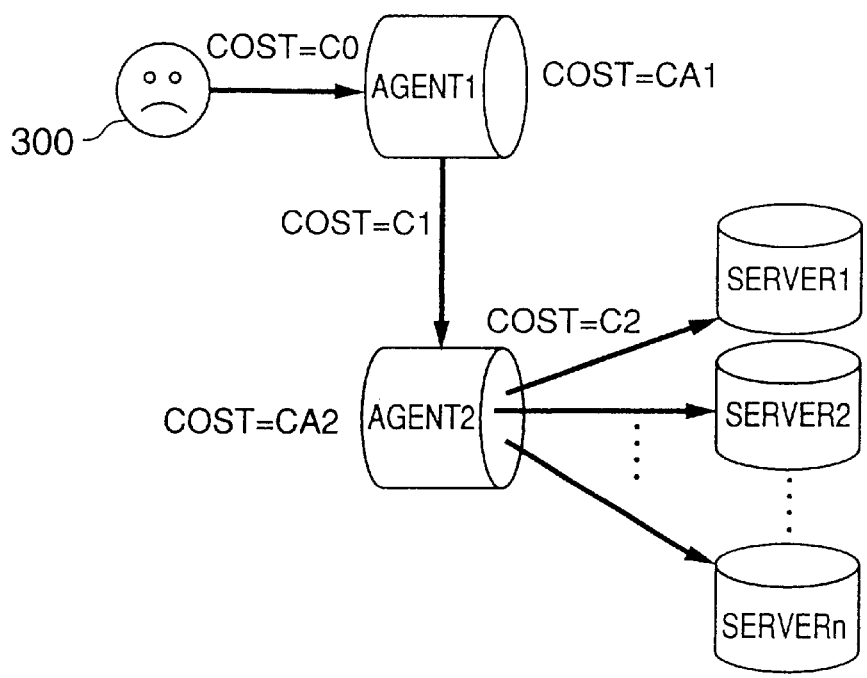
FIG. 17 is an explanatory view of a request transfer cost in the advertisement system.

FIG. 17 is an explanatory view of the request transfer cost in the advertisement system.

As shown in FIG. 17, suppose that the transmission cost for transferring the request to the client-side Agent 1 from the client 300 is C0, the transmission cost for transferring the request to the server-side Agent 2 from the client-side Agent 1 is C1, the transmission cost for transferring the request to the respective servers Server 1, Server 2, . . . , Server n from the server-side agent is uniformly C2, and the calculation costs necessary for the client-side Agent 1, server-side Agent 2 to calculate the transfer destination of the request are Ca1, Ca2. Then, the transfer cost W for transferring the request to the n servers from the client 300 in the advertisement system is calculated as follows.

$$W = C0 + Ca1 + C1 + Ca2 + n*C2$$

Figure 18:
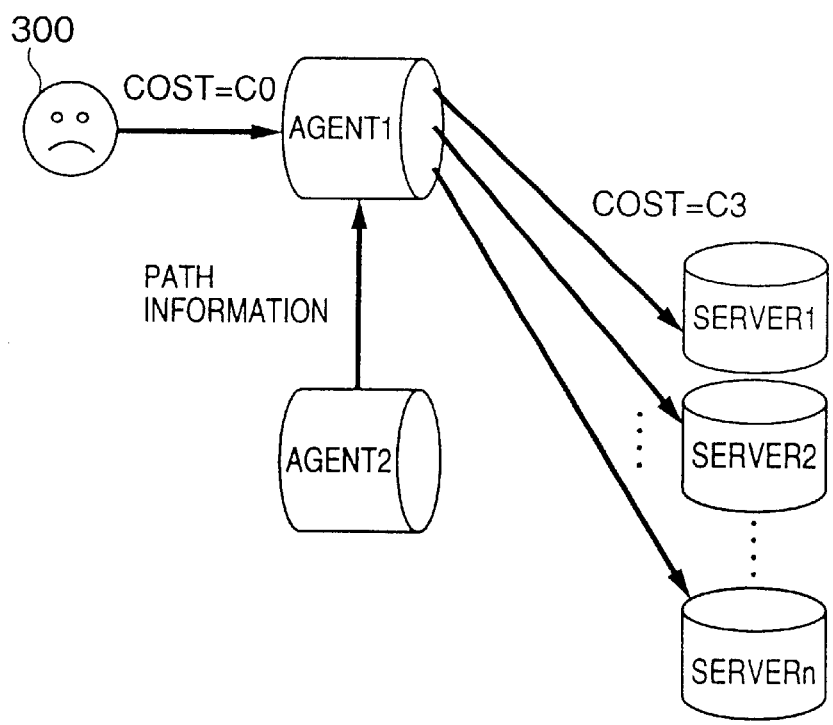
FIG. 18 is an explanatory view of the request transfer cost in the replication system.

FIG. 18 is an explanatory view of the request transfer cost in the replication system.

Similarly to FIG. 17, supposing that the transmission cost for transferring the request to the client-side Agent 1 from the client 300 is C0, the calculation cost for the client-side Agent 1 to calculate the transfer destination of the request is Ca1, and the transmission cost for transferring the request to the respective servers Server 1, Server 2, . . . , Server n from the client-side Agent 1 is uniformly C3, the transfer cost Z for transferring the request to the n servers from the client 300 in the replication system is calculated as follows.

$$Z = C0 + Ca1 + n*C3$$

Moreover, supposing that a difference W−Z of the advertisement system transfer cost W and the replication system transfer cost Z is C3=C1+C2, the calculation is as follows.

$$W - Z = (C0 + Ca1 + C1 + Ca2 + n*C2) - (C0 + Ca1 + n*C3) = Ca2 + C1 + n*C2 - n*C3 = Ca2 + C1 + n*C2 - n*(C1 + C2) = Ca2 - (n-1)*C1$$

Therefore, in view of the cost, the advertisement system has to be selected when:

W<Z, that is, Ca2<(n−1)*C1. When W>Z, the replication system is more advantageous in the cost.

Additionally, the number of servers to which the same request is actually transferred is preferably used as the number n of the servers to which the response is to be transferred. Therefore, in the present embodiment, when the advertisement system is selected, the server-side agent performs the cost comparison, and judges whether or not the advertisement system has to be switched to the replication system. Conversely, when the replication system is selected, the client-side agent performs the cost comparison, and judges whether or not the replication system has to be switched to the advertisement system.

Moreover, it is difficult to accurately obtain the cost Ca2 or C1. Therefore, to perform approximate judgment, a proposed method comprises comparing the threshold value predetermined by estimating the cost Ca2 or C1 with the number n of addressee servers. When the number n exceeds the threshold value, the advertisement system is selected, otherwise the replication system is selected.

Figure 19:
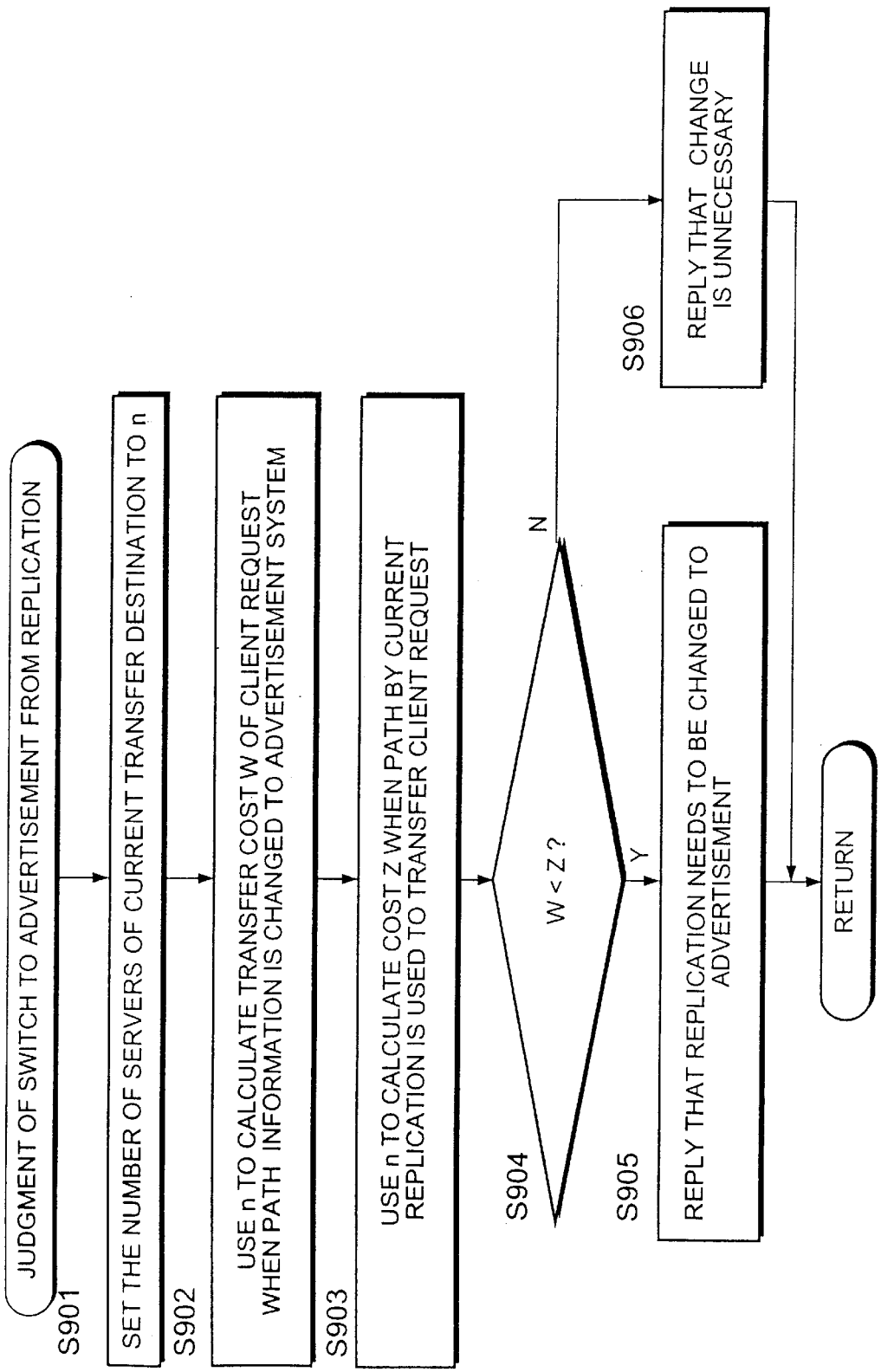
FIG. 19 is a flowchart showing a processing of judging whether or not to replication is switched to advertisement.

FIG. 19 is a flowchart showing a processing of judging whether or not to switch to advertisement from replication.

This processing is performed at step S802 when the propagation mode indicates the replication system in the propagation control processing of the client-side agent shown in FIG. 16 (step S801: Y), and the propagation control processing shown in FIG. 16 is executed at step S205 when it is determined in the main routine shown in FIG. 10 that the timer message is received (step S204: Y).

This processing comprises: obtaining the number n of the servers to which the request is now transferred is obtained (step S901); and using the number n of servers to calculate the transfer cost W when the propagation mode is switched to the advertisement system as described above (step S902). Moreover, the number n of servers is used to calculate the transfer cost Z by the current replication system as described above (step S903).

Thereafter, the transfer cost W is compared with the transfer cost Z (step S904). When the transfer cost W is lower than the transfer cost Z (step S904: Y), it is replied that the replication needs to be switched to the advertisement (step S905). When the transfer cost W is equal to or more than the transfer cost Z (step S904: N), it is replied that the switching is unnecessary (step S906).

Figure 20:
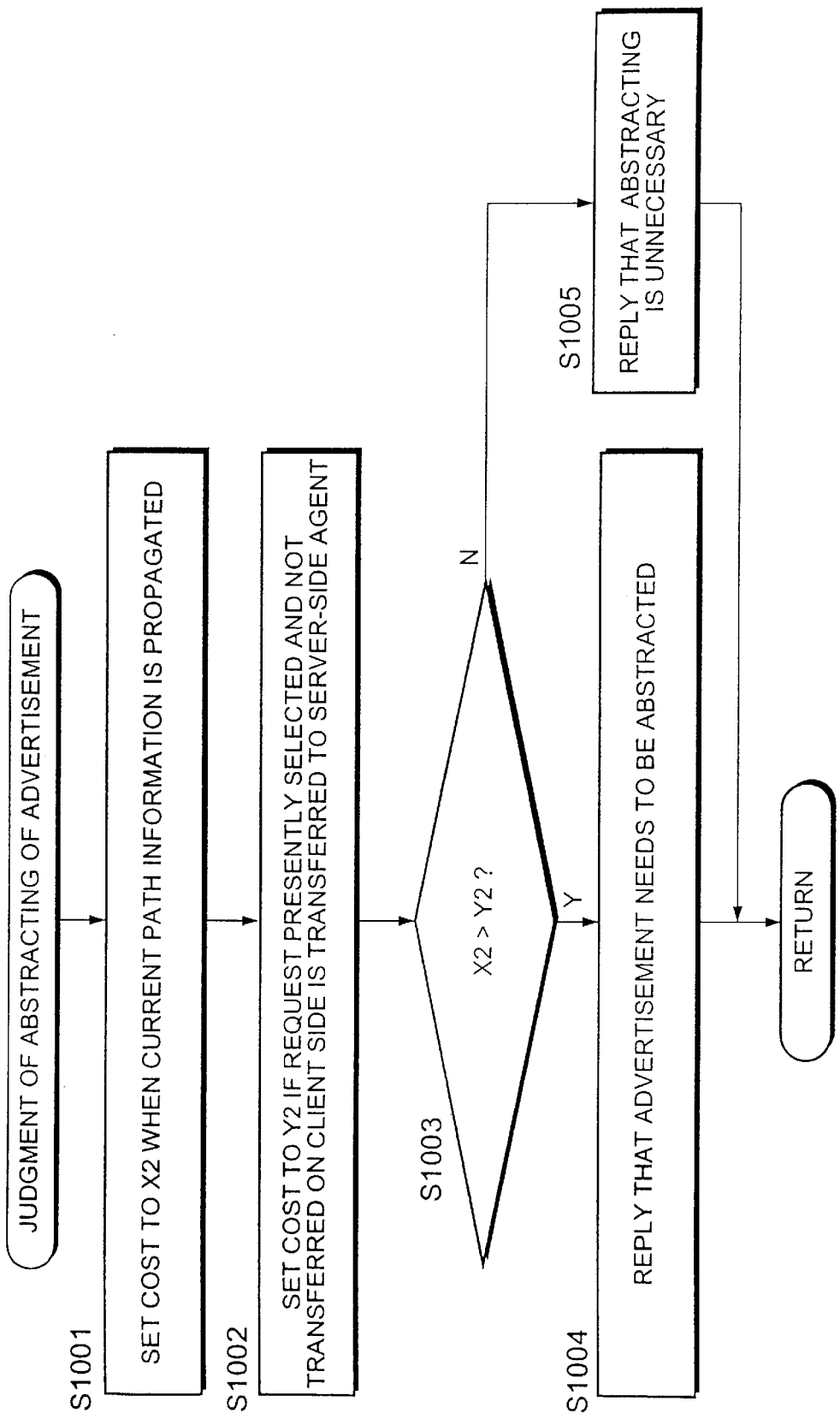
FIG. 20 is a flowchart showing a processing of judging whether or not it is necessary to abstract the server condition to be advertised.

FIG. 20 is a flowchart showing a processing of judging whether or not it is necessary to abstract the server condition to be advertised.

This processing is executed when the propagation mode indicates the advertisement system in the propagation control processing of the client-side agent shown in FIG. 16 (step S801: N), and the propagation control processing shown in FIG. 16 is executed at step S205 when it is determined in the main routine shown in FIG. 10 that the timer message is received (step S204: Y).

The client-side agent can estimate whether or not the path information server condition received in the current advertisement system is appropriate in view of the above-described tradeoff relation of the server condition propagation cost and request transfer cost.

Supposing that the current data size of the server condition included in the path information propagated in the advertisement is Sad, and the effective period of the path information is L, the propagation cost X2 of the presently received server condition is calculated in an equation X2=Sad/L (step S1001).

Moreover, supposing that a frequency at which the request inhibited from being transferred to the server-side agent for selection by the current path information is received per unit time is Freq, and the average data size of the request is Sreq, the cost Y2 incurred if the request presently inhibited from being transferred is transferred to the server-side agent is calculated in an equation Y2=Sreq*Freq (step S1002).

The cost X2 is compared with Y2 calculated as described above (step S1003). When X2>Y2 (step S1003: Y), specifically, when the path information server condition received by the advertisement has less effect of transfer inhibition for the propagation cost, it is replied that the server condition for use in the advertisement needs to be abstracted (step S1004).

On the other hand, when the cost X2 is compared with Y2 (step S1003), and X2≦Y2 (step S1003: N), it is replied that the abstracting is unnecessary (step S1005).

Additionally, here, for the server condition propagation cost and the transfer cost for transferring the request, the amount of messages actually flowing through the network, that is, the product of the size and number of the messages to be transmitted is calculated. However, more briefly, the method may comprise calculating the cost with the number of transmitted messages in an approximate manner.

The propagation control processing of the client-side agent has been described above, and the propagation control processing of the server-side agent will next be described.

Figure 21:
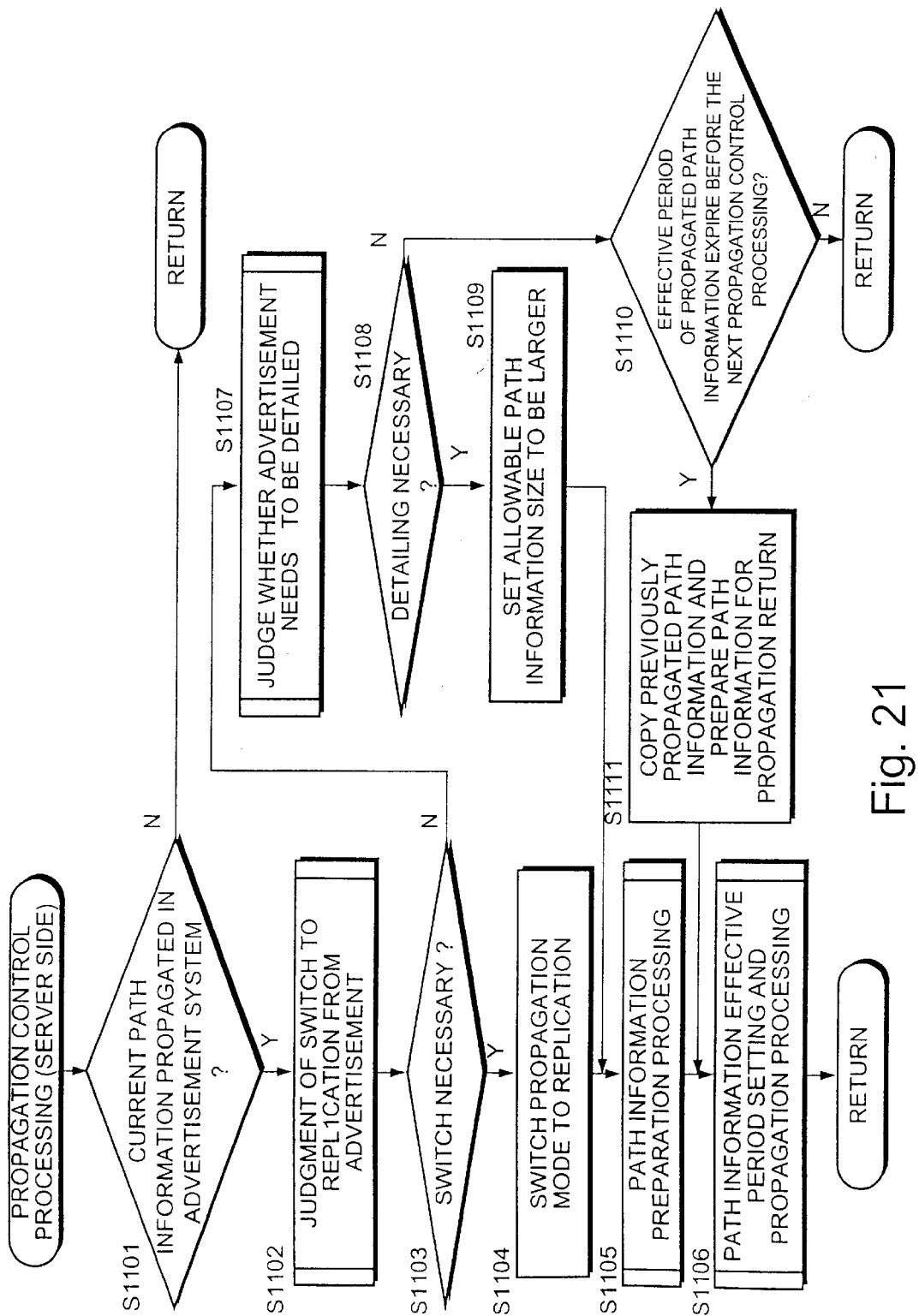
FIG. 21 is a flowchart of the propagation control processing of the server-side agent.

FIG. 21 is a flowchart of the propagation control processing of the server-side agent.

This propagation control processing is executed at step S305 when it is judged that the timer message is received (step S304: Y) in the main routine shown in FIG. 11.

Similarly to the propagation control processing of the client-side agent, the propagation control processing of the server-side agent is also performed in accordance with the current propagation mode indicating the advertisement system or the replication system.

When the propagation mode indicates the replication system (step S1101: N), nothing is processed, and the flow returns to the main routine of FIG. 11.

When the propagation mode indicates the advertisement system (step S1101: Y), it is judged whether or not the advertisement needs to be switched to the replication as described later (step S1102), and the switching is judged to be necessary (step S1103: Y), the propagation mode is switched to the replication system (step S1104). This step S1104 is one example of the switch means of the present invention. Thereafter, new path information is prepared (step S1105), the effective period of the newly prepared path information is set, and the path information is propagated to the client-side agent (step S1106)

When it is judged that the switching to the replication from the advertisement is unnecessary (step S1103: N), it is judged whether or not the server condition propagated by the advertisement needs to be detailed as described later (step S1107), and it is judged that the detailing is necessary (step S1108: Y), the propagation information size which defines the data size of the path information to be advertised is set to be larger (step S1109). Thereafter, similarly as described above, new path information is prepared (step S1105), the effective period of the newly prepared path information is set and the path information is propagated to the client-side agent (step S1106).

When it is judged that the switching to the replication from the advertisement is unnecessary (step S1103: N), and it is judged that the detailing of the server condition is unnecessary (step S1108: N), that is, the current advertisement may be used, it is checked whether or not the path information already propagated to the client-side agent expires until the next timer message is generated (step S1110). When the information does not expire (step S1110: N), the flow returns to the main routine of FIG. 11 as it is. When the information expires (step S1110: Y), the previous propagated path information is copied (step S1111), the new effective period is set and the copied path information is propagated (step S1106).

Figure 22:
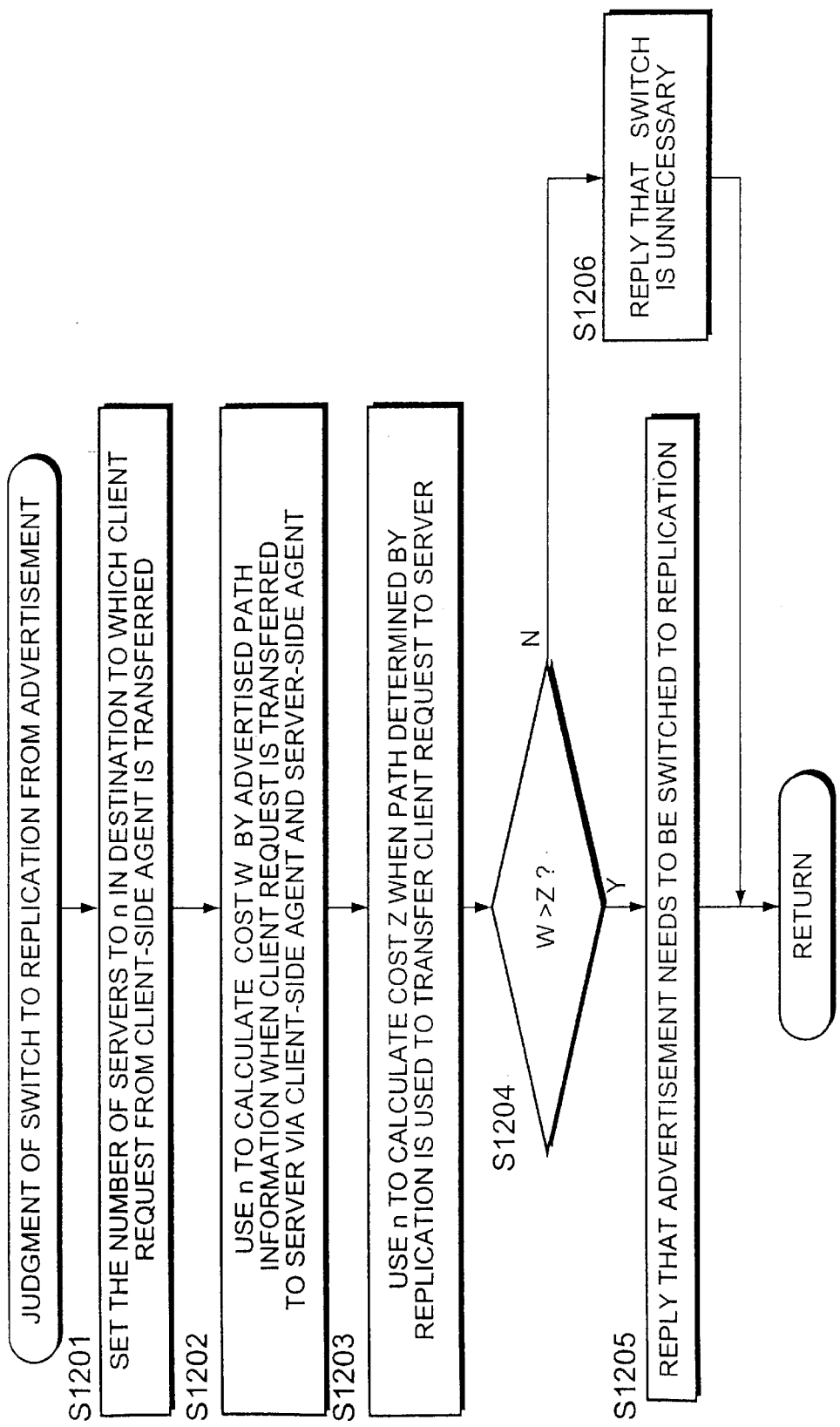
FIG. 22 is a flowchart showing a processing of judging whether or not the advertisement is switched to the replication.

FIG. 22 is a flowchart showing a processing of judging whether or not to switch to the replication from the advertisement.

This processing is performed at step S1102 when the propagation mode indicates the advertisement system in the propagation control processing of the server-side agent shown in FIG. 21 (step S1101: Y), and the propagation control processing shown in FIG. 21 is executed at step S305 when it is determined in the!main routine shown in FIG. 11 that the timer message is received (step S304: Y).

Steps S1202 to S1203 of FIG. 22 correspond to the steps S901 to S903 of FIG. 19, and the transfer cost W of the advertisement system and transfer cost Z of the replication system are calculated as described above.

Thereafter, the transfer cost W is compared with the transfer cost Z (step S1204). When the transfer cost W is higher than the transfer cost Z (step S1204: Y), it is replied that the advertisement needs to be switched to the replication (step S1205). When the transfer cost W is equal to or less than the transfer cost Z (step S1204: N), it is replied that the switching is unnecessary (step S1206).

Figure 23:
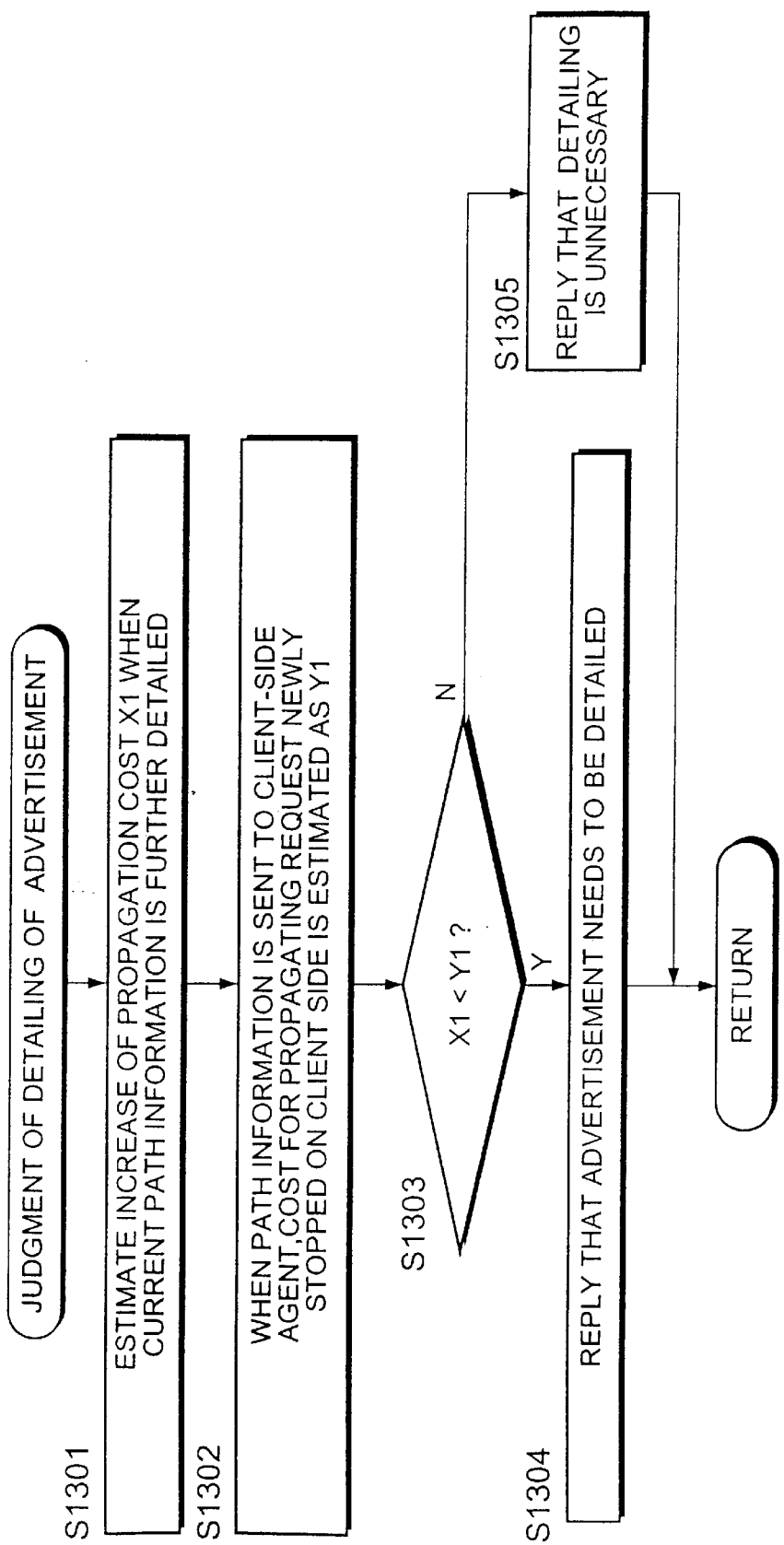
FIG. 23 is a flowchart showing a processing of judging whether or not it is necessary to detail the server condition to be advertised.

FIG. 23 is a flowchart showing a processing of judging whether or not it is necessary to detail the server condition to be advertised.

This processing is executed at step S1107 of the propagation control processing of the server-side agent shown in FIG. 21, and the propagation control processing shown in FIG. 21 is executed at step S305 when it is determined in the main routine shown in FIG. 11 that the timer message is received (step S304: Y).

If the advertisement is performed using more detailed server condition than the current condition, the server-side agent can estimate from the request previously transmitted to the server-side agent whether the advertisement is suitable in view of the cost.

Specifically, the server-side agent can obtain the difference of the current propagated server condition and the condition obtained by further detailing the server condition, and can estimate the increase of the propagation cost of the path information if the detailed server condition is propagated to the client-side agent. Moreover, for the requests previously transmitted to the agent, if the detailed server condition is propagated to the client-side agent and the request is selected by the client-side agent, the request is inhibited from being transferred in the client-side agent. Specifically, the transfer cost necessary for actually transferring these requests corresponds to the decrease of the request transfer cost which can be expected when the advertisement is performed using the detailed server condition.

Supposing that the data size of the server condition presently propagated in the advertisement is S1, the data size of the detailed server condition is S2, and the effective period of the path information is L, the propagation cost X1, which increases when the server condition is detailed, is calculated in an equation X1=(S2−S1)/L (step S1301).

Moreover, supposing that the frequency of requests reaching per unit time is F1, the frequency of requests reaching the server-side agent even when the server condition is detailed among the presently reached requests is F2, and the average data size of one request is Sreq, the request transfer cost Y1 necessary for actually transferring the request, which must have been inhibited from being transferred to the server-side agent if the advertisement using the detailed server condition were performed beforehand, is calculated in an equation Y1=Sreq*(F1−F2) (step S1302).

When the propagation cost X1 calculated in this manner is compared with the request transfer cost Y1 (step S1303), it is judged that X1<Y1 (step S1303: Y), that is, the decrease value of the request transfer cost is larger than the increase value of the propagation cost, it is worth actually performing the advertisement using the detailed server condition. Therefore, it is replied that the server condition for use in the advertisement needs to be detailed (step S1304).

On the other hand, when the propagation cost X1 is compared with the request transfer cost Y1 (step S1303), and it is judged that X1≧Y1 (step S1303: N), it is replied that detailing is unnecessary (step S1305).

Figure 24:
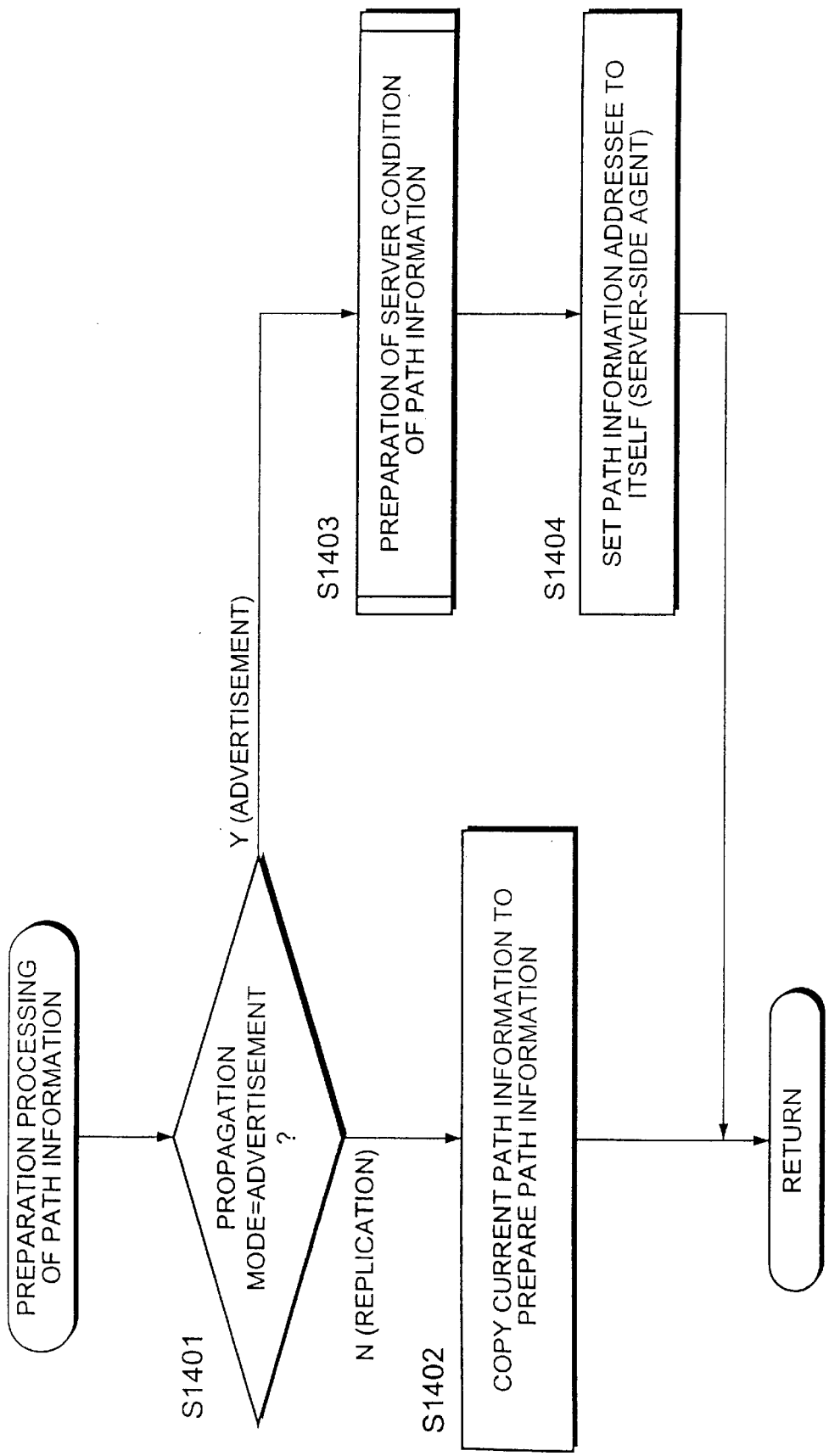
FIG. 24 is a flowchart showing a preparation processing of path information.

FIG. 24 is a flowchart showing a processing of preparing the path information.

This processing is executed at step S1105 of the propagation control processing of the server-side agent shown in FIG. 21, and the propagation control processing shown in FIG. 21 is executed at step S305 when it is determined in the main routine shown in FIG. 11 that the timer message is received (step S304: Y).

In this processing, when the propagation mode indicates the replication system (step S1401: N), the path information presently held by itself for the request transfer is copied and the path information for the replication is prepared (step S1402).

On the other hand, when the propagation mode indicates the advertisement system (step S1401: Y), the server condition of the path information for the advertisement is prepared (step S1403), and the self (server-side agent) address is set as the path information address (step S1404).

Figure 25:
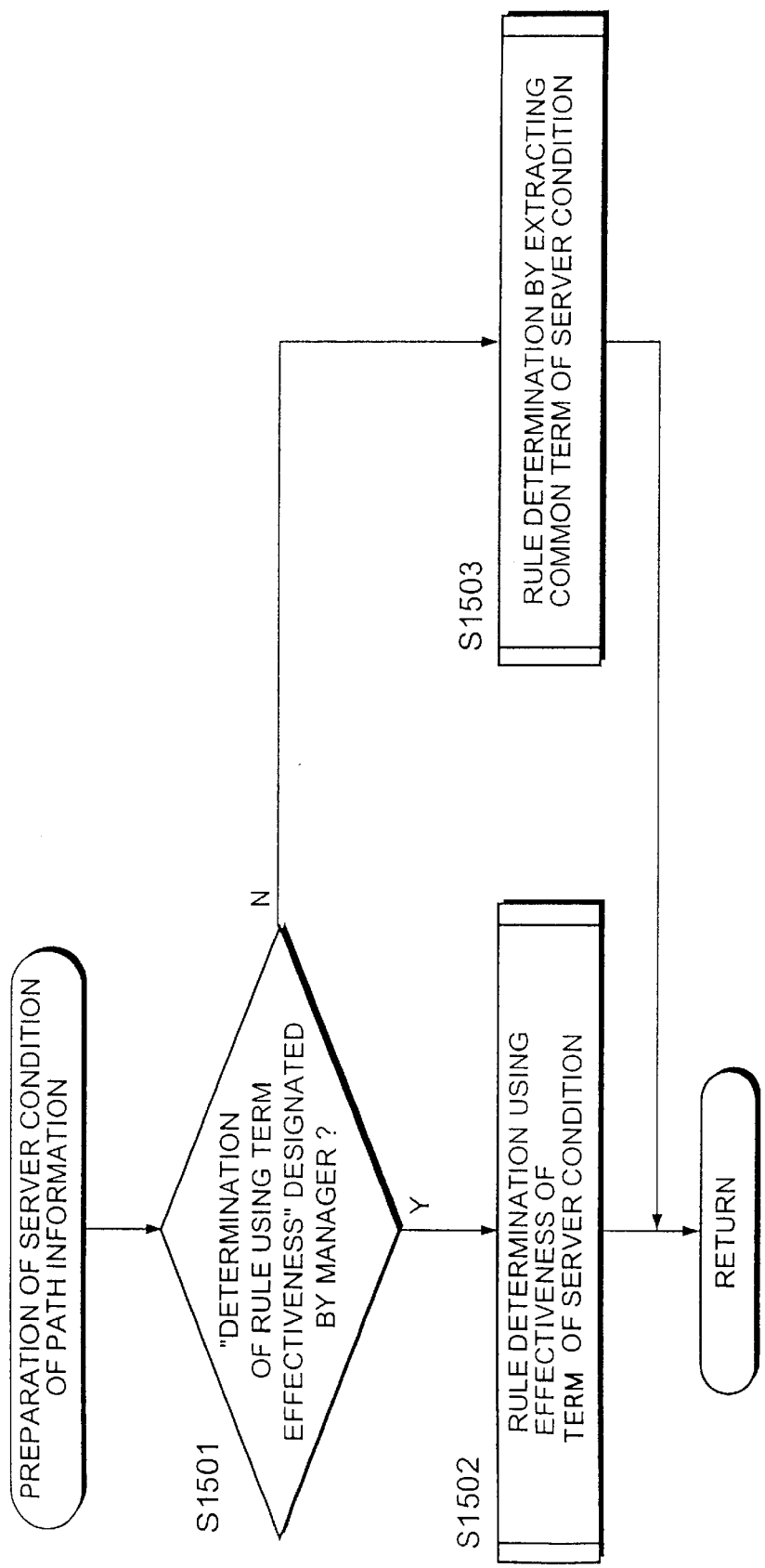
FIG. 25 is a flowchart showing a preparation processing of the server condition of the path information.

FIG. 25 is a flowchart showing a processing of preparing the server condition of the path information.

This processing is executed at step S1403 when the propagation mode indicates the advertisement system in the preparation processing of the path information shown in FIG. 24, the preparation processing of the path information shown in FIG. 24 is executed at step S1105 of the propagation control processing of the server-side agent shown in FIG. 21, and the propagation control processing shown in FIG. 21 is executed at step S305 when it is determined in the main routine shown in FIG. 11 that the timer message is received (step S304: Y).

The preparation processing of the server condition of the path information shown in FIG. 25 comprises: determining a rule determining method designated by the manager (step S1501); and determining the rule in the rule determining method in accordance with a determination result (steps S1502, S1503).

Figure 26:
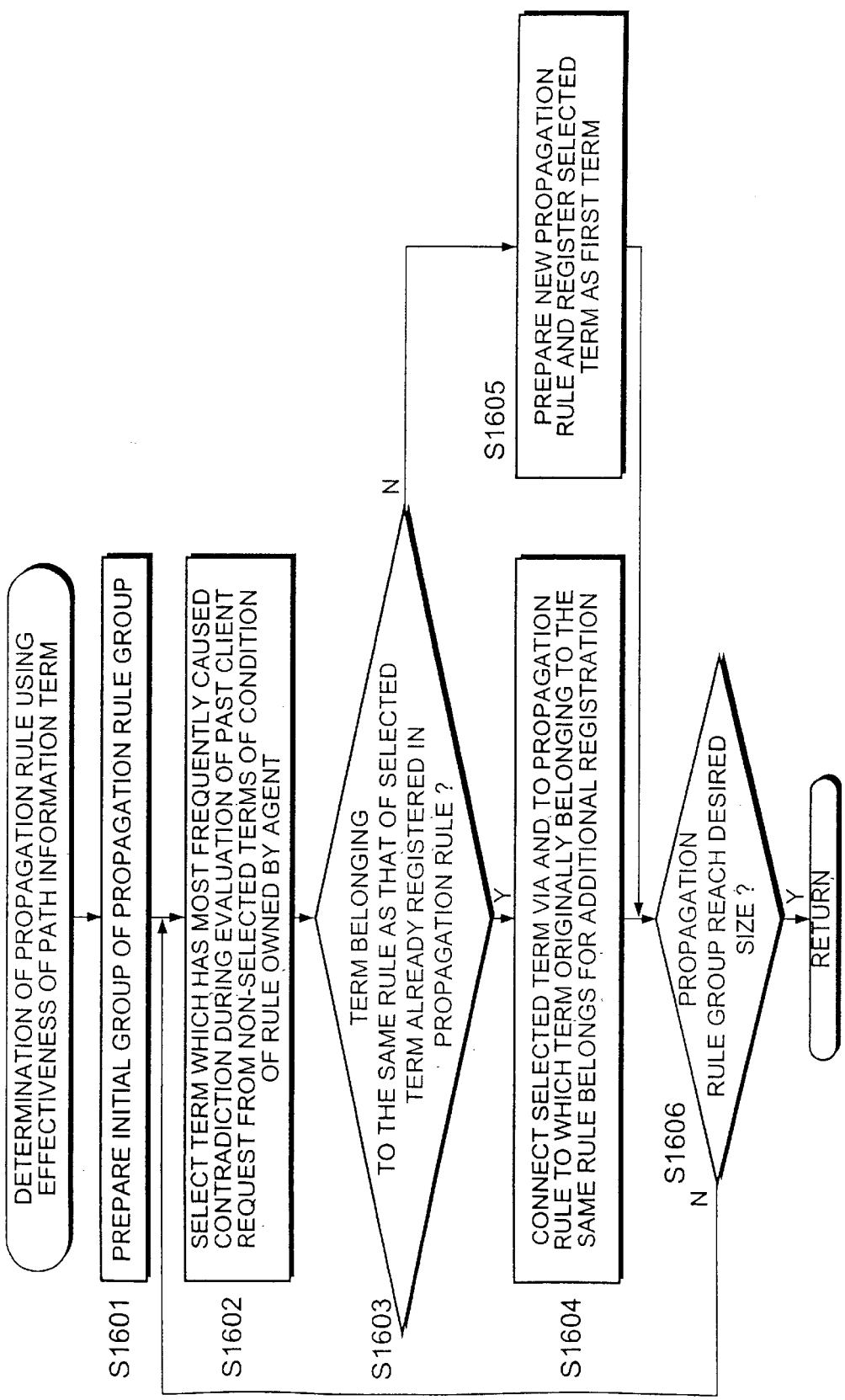
FIG. 26 is a flowchart showing a processing of determining a propagation rule using the effectiveness of a path information term.

FIG. 26 is a flowchart showing a processing of determining the propagation rule using the effectiveness of the term of the path information.

This determination processing is executed at step S1502 when the determining method using the effectiveness of the term is designated by the manager in the preparation processing of the server condition of the path information shown in FIG. 25.

Here, the principle of the method of determining the propagation rule in the determination processing will be described. Additionally, only the server condition of the propagation rule is determined here, and the rule address for the propagation is not determined.

The determination processing comprises: preparing the condition corresponding to the server condition which is abstracted by deleting one or more terms constituting the path information server condition held by the server-side agent.

For example, when the path information server condition is "Condition A AND Condition B AND Condition C", the abstracting is performed by deleting the term.

Either one of the following server conditions is prepared:

Condition A AND Condition B
Condition A AND Condition C
Condition B AND Condition C
Condition A
Condition B
Condition C Moreover, the term to be preferentially left or the term to be preferentially deleted is determined based on the effectiveness obtained by repeating the condition comparison in the step S605 of FIG. 14. This is because if the term contradicting many of the requests from the client is propagated, the request transfer amount is effectively largely reduced.

A concrete procedure of determining the rule in the determination processing of FIG. 26 will be hereinafter described.

First, the initial group of rules for the propagation is prepared (step S1601). The initial group in the case in which the server condition is abstracted is an empty group, and the initial group in the case in which the server condition is detailed is the previously prepared propagation rule group.

Subsequently, the term which is not included in the propagation rule group and which has the highest effectiveness is selected from the server condition terms owned by the server-side agent (step S1602). Additionally, when the server condition is abstracted, as the effectiveness of the previously propagated term, the previously prepared effectiveness is used as it is. Subsequently, it is checked whether or not the term originally belonging to the same rule as that of the selected term is already present in the propagation rule group (step S1603). When the term is present (step S1603: Y), the selected term is connected via "AND" to the rule of the term originally belonging to the same rule as that of the selected term among the rules of the propagation rule group (step S1604). When the term originally belonging to the same rule as that of the selected term is not present in the propagation rule group (step S1603: N), the selected term is registered as the first term of the new rule of the propagation rule group (step S1605).

Thereafter, the selection and connection (steps S1602 to S1605) of the term are repeated until the data size of the propagation rule group reaches the transmission information size. When the size reaches the transmission information size (step S1606: Y), the flow returns to the preparation processing of the server condition of the path information shown in FIG. 25.

Figure 27:
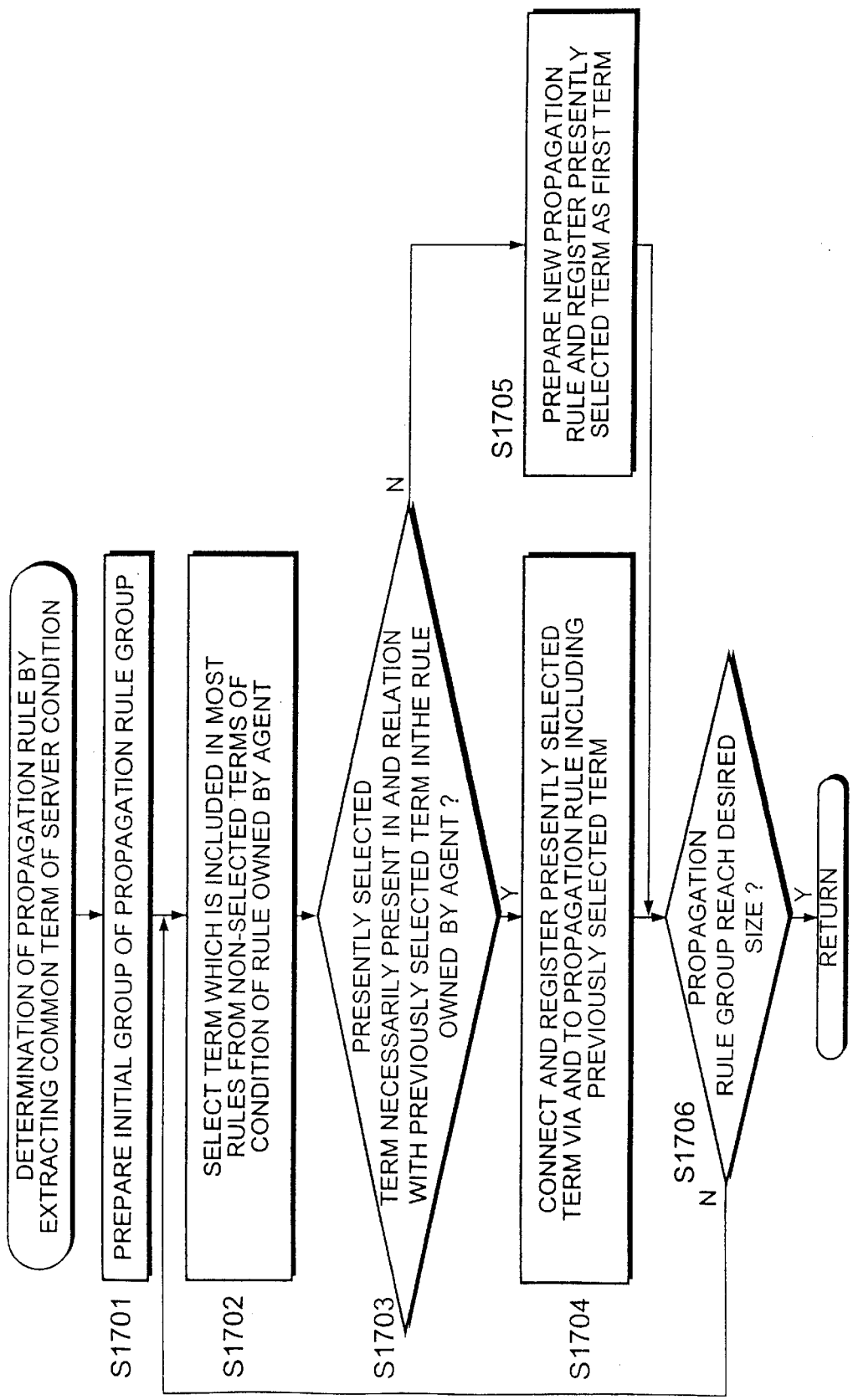
FIG. 27 is a flowchart showing a processing of determining the propagation rule by extracting the common term of the server condition.

FIG. 27 is a flowchart showing a processing of determining the propagation rule by extracting the common term of the server condition.

This processing is executed at step S1503 when the manager designates the determining method by extraction of the common term in the preparation processing of the server condition of the path information shown in FIG. 25, and the preparation processing of the server condition of the path information shown in FIG. 25 is executed at step S1403 when the propagation mode indicates the advertisement system in the preparation processing of the path information shown in FIG. 24. Moreover, the preparation processing of the path information shown in FIG. 24 is executed at step S1105 of the propagation control processing of the server-side agent shown in FIG. 21, and further the propagation control processing shown in FIG. 21 is executed at step S305 when it is judged in the main routine shown in FIG. 11 that the timer message is received (step S304: Y).

Here, the principle of the method of determining the propagation rule in the determination processing will be described. Additionally, only the server condition of the propagation rule is also determined, and the propagation rule address is not determined here.

This determination processing is on the assumption that a plurality of server conditions are registered in the server-side agent, the common term included in the plurality of server conditions is extracted, and the extracted terms are connected to determine the propagation rule.

For example, when the agent has the following three rules:

Condition A AND Condition B→Server 1;

Condition A AND Condition C→Server 2; and

Condition A AND Condition D→Server 3, the common term "Condition A" included in these three rule server conditions is extracted.

Moreover, for example, when the agent has the following four rules:

Condition A AND Condition B Server 1;

Condition A AND Condition C→Server 2;

Condition D AND Condition E→Server 3; and

Condition D AND Condition F→Server 43 two terms "Condition A", "Condition D" are extracted. Additionally, since these terms do not originally belong to the same rule, they are used as the propagation rules independent of one another.

A concrete method of determining the rule in the determination processing of FIG. 7 will be described hereinafter.

Steps S1701 and S1703 to S1706 shown in FIG. 27 correspond to the steps S1601 and S1603 to S1606 shown in FIG. 26, and the procedure of determining the rule in the determination processing of FIG. 27 is substantially the same as the procedure of determining the rule in the determination processing of FIG. 26. Additionally, in the step S1702 shown in FIG. 27, the term which is not included in the propagation rule group and which is common to the largest number of rules is selected from the terms of the server conditions owned by the server-side agent.

Figure 28:
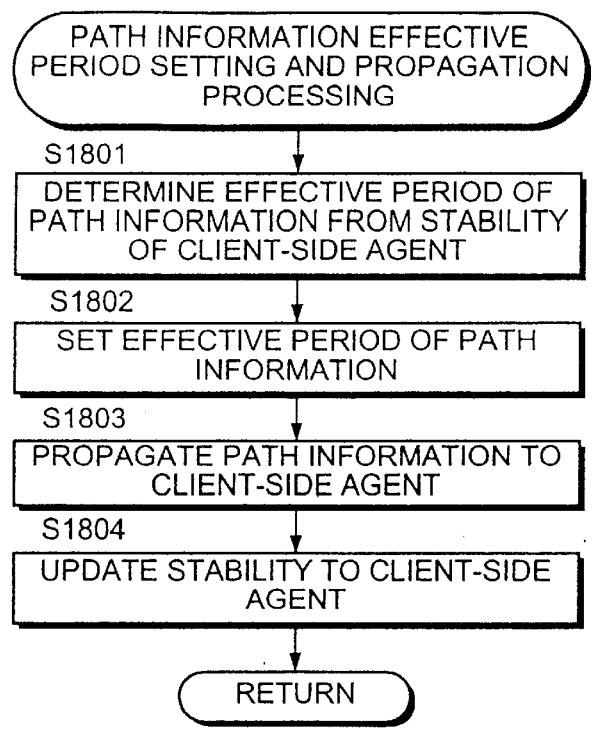
FIG. 28 is a flowchart showing a path information effective period setting and propagation processing.

FIG. 28 is a flowchart showing a path information effective period setting and propagation processing.

This processing is executed at step S1106 of the propagation control processing of the server-side agent shown in FIG. 21, and the propagation control processing shown in FIG. 21 is executed at step S305 when it is judged in the main routine shown in FIG. 11 that the timer message is received (step S304: Y).

The processing shown in FIG. 28 comprises: calculating the effective period of the path information based on the stability of the client-side agent which is a transmitter as described later (step S1801); setting the calculated effective period as the effective period of the path information (step S1802); and propagating the path information provided with the effective period to the client-side agent (step S1803). When the propagation of the path information is successful, the stability of the client-side agent is updated by the stability update processing shown in FIG. 15 (step S1804).

Figure 29:
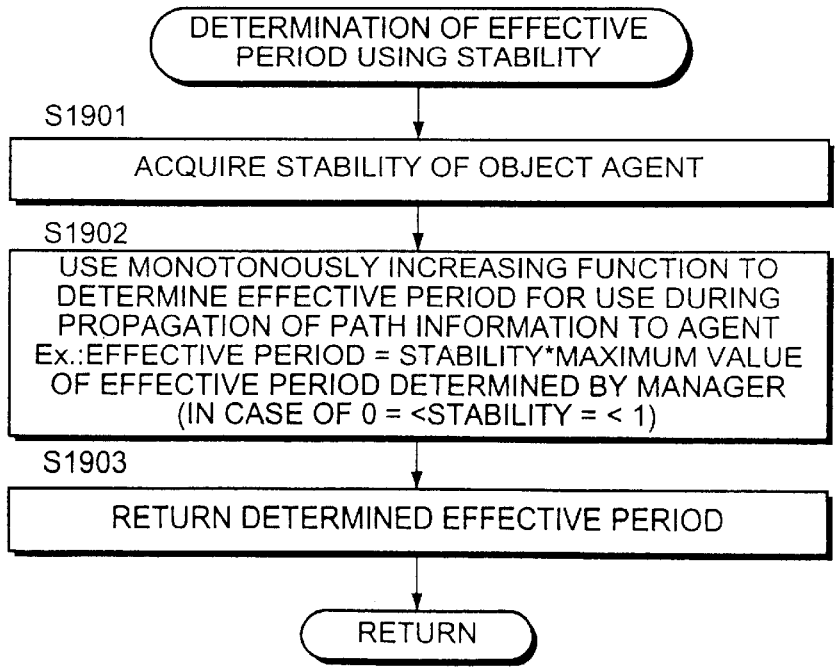
FIG. 29 is a flowchart showing a processing of determining the effective period using the stability.

FIG. 29 is a flowchart showing a processing of determining the effective period using the stability.

This processing is executed at step S1801 in the path information effective period setting and propagation processing shown in FIG. 28 when the calculation of the effective period is necessary.

As described above, it is preferable to provide the path information propagated to the client-side agent with the effective period, and again perform the advertisement or the like before the set effective period elapses.

The longer the effective period of the path information is, the lower the cost for propagating the information is, but the longer effective period raises a risk of communication failure. Therefore, the effective period of the path information has to be determined in consideration of the connection stability between the agents.

In the processing of FIG. 29, first the stability of the object agent is acquired (step S1901). Subsequently, the effective period is determined from the stability using the function in a monotonous increase relation such that the higher stability lengthens the effective period (step S1902). FIG. 29 shows one example of the method of determining the effective period from the stability which takes either value from value "0" to "1".

Thereafter, the determined effective period is returned (step S1903), and the flow returns to the path information effective period setting and propagation processing shown in FIG. 28.

Figure 30:
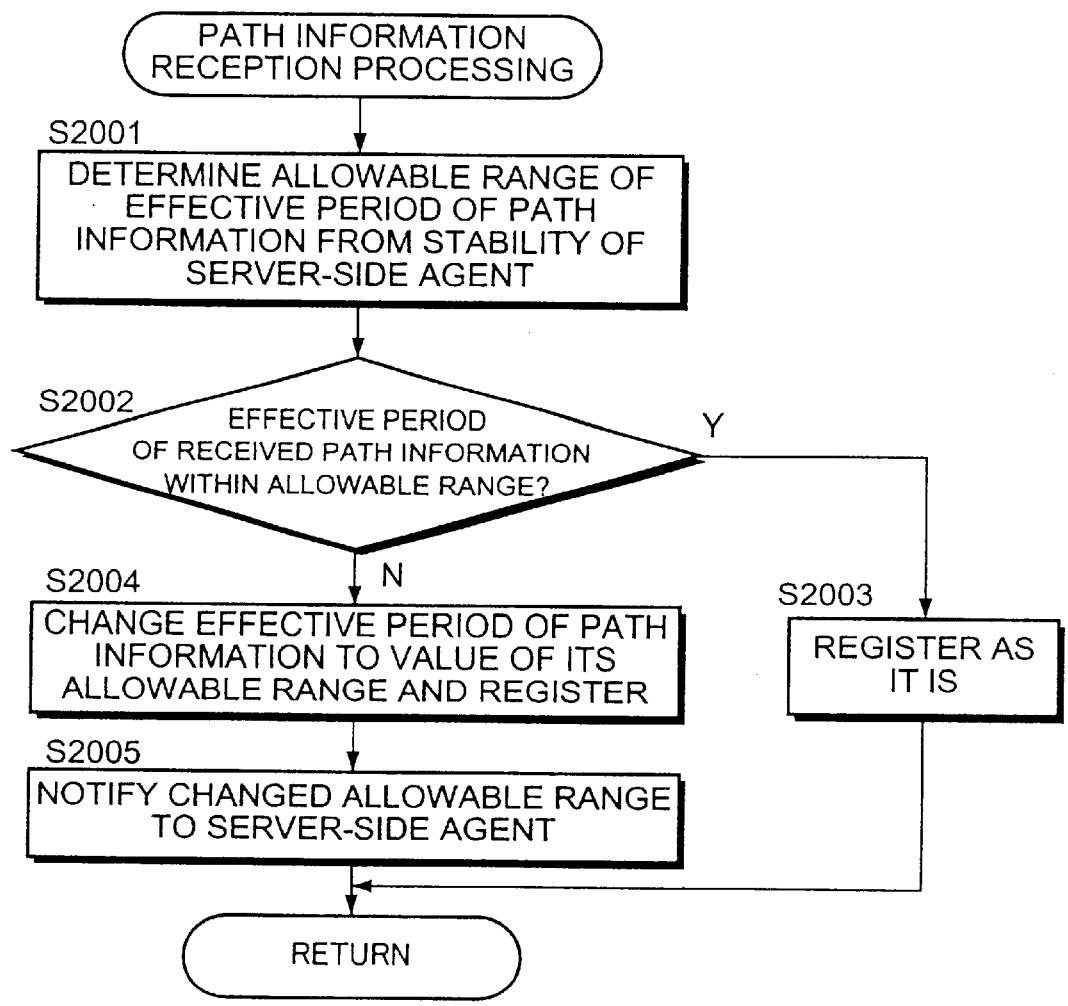
FIG. 30 is a flowchart of a path information reception processing.

FIG. 30 is a flowchart of a path information reception processing.

The path information reception processing is executed at step S205 when it is judged in the main routine shown in FIG. 10 that the path information propagated from the server-side agent is received.

The path information reception processing comprises: first determining the allowable range of the effective period of the path information from the stability to the server-side agent from which the path information is propagated as described later (step S2001); and receiving the path information as it is when the effective period of the propagated path information is within the allowable range (step S2002: Y) (step S2003).

On the other hand, when the effective period of the propagated path information is out of the allowable range (step S2002: N), the effective period is changed to the effective period based on the stability estimated by the client-side agent with respect to the server-side agent (step S2004), and the changed effective period is notified to the server-side agent (step S2005).

Figure 31:
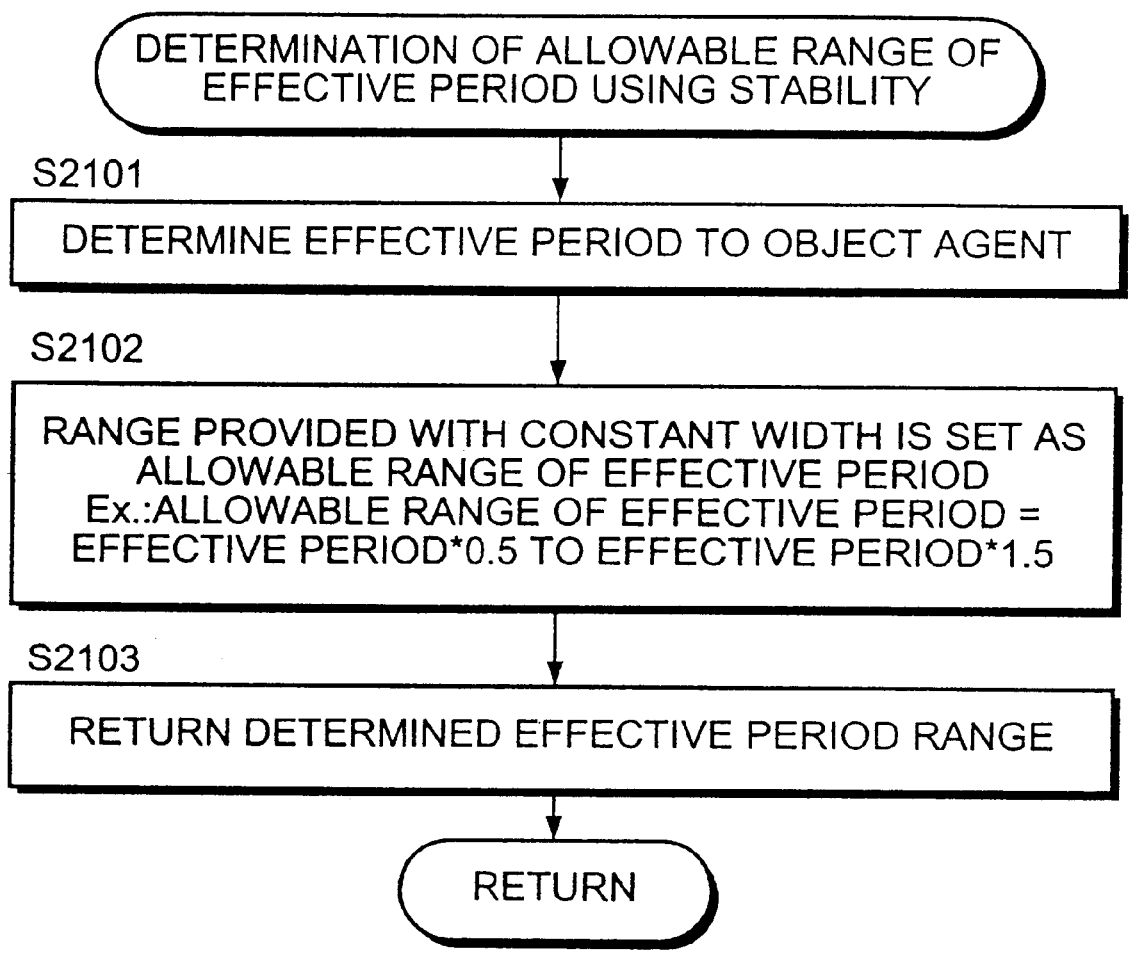
FIG. 31 is a flowchart showing a processing of determining the allowable range of the effective period using the stability.

FIG. 31 is a flowchart showing a processing of determining the allowable range of the effective period using the stability.

This processing is executed at step S2001 of the path information reception processing shown in FIG. 30, and the path information reception processing shown in FIG. 30 is executed at the step S205 when it is judged in the main routine shown in FIG. 10 that the path information propagated from the server-side agent is received.

In the processing of FIG. 31, first the effective period to the object agent is calculated by the processing shown in FIG. 29. Subsequently, for the calculated effective period, a range provided with a constant width is determined as the allowable range. FIG. 30 shows one example of a method of calculating the allowable range.

Thereafter, the determined allowable period is returned, and the flow returns to the path information reception processing shown in FIG. 30.

Figure 32:
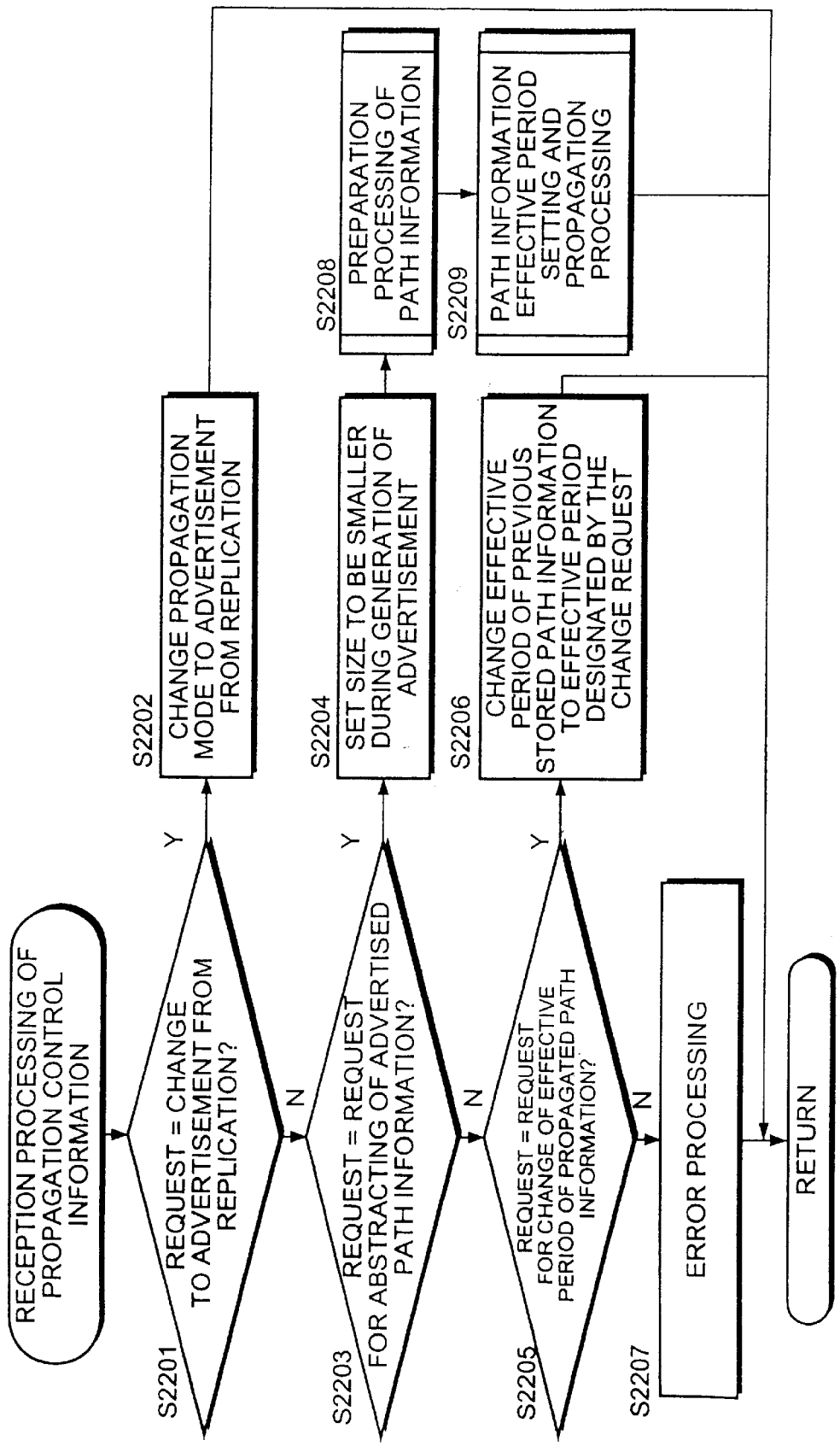
FIG. 32 is a flowchart showing a reception processing of propagation control information.

FIG. 32 is a flowchart showing a processing of receiving propagation control information.

This reception processing is executed at step S307 when the change request of the propagation control information is sent from the client-side agent in the flowchart shown in FIG. 11.

The change request of the propagation control information sent from the client-side agent includes three types of requests. When the received request is a request for the change to the advertisement from the replication (step S2201: Y), the propagation mode is switched to the advertisement system (step S2202).

When the received request is a request for the abstracting of the advertisement (step S2203: Y), the propagation information size which is the criterion of the data size during generation of the path information is set to be smaller than the current size (step S2204), a new path is prepared (step S2208), and the new path information is provided with the effective period and propagated (step S2209).

Moreover, when the received request is a notification of the effective period change (step S2205: Y), the effective period of the stored the propagation information is changed in accordance with the notified effective period (step S2206). The path information is again propagated before the changed effective period expires.

When the received request is neither one of the above-described three requests, an error processing is executed (step S2207), and the flow returns to the flowchart shown in FIG. 11.

In the above description of the embodiment, as the system structure, the system constituted of the client, client-side agent, server-side agent, and server has been described. However, the system to which the selection intermediary apparatus or the transmission apparatus of the present invention is applied is not limited to the system constituted as described above, and the present invention can be applied to various system constitutions.

The system to which the selection intermediary apparatus or the transmission apparatus of the present invention is applied may be a system constituted, for example, by incorporating the transmission apparatus of the present invention into the client, and incorporating the selection intermediary apparatus of the present invention into the server.

Moreover, the selection intermediary apparatus or the transmission apparatus of the present invention can also be applied to the linking of a plurality of name servers. The name server is a server to return the server address which satisfies the designated condition. In the constitution of the above-described embodiment, the request issued by the client is transmitted to the server via the client-side agent and server-side agent. However, when the last server is a special server-side agent which returns a server address, the entire system operates as the name server. The selection intermediary apparatus or the transmission apparatus of the present invention can also be applied to the system.

Furthermore, in the above-described embodiment, the simplified system constituted of two agents, the client-side agent and server-side agent has mainly been described. However, the selection intermediary apparatus or the transmission apparatus of the present invention can be applied as it is to the constitution in which one client-side agent is linked with a large number of server-side agents, or a large number of client-side agents are linked with one server-side agent.

Moreover, when seen from the certain agent, it does not have to be known or it cannot be known whether the destination of the server-side agent is an ordinary server, or whether the server-side agent is connected to another agent. This can also apply to the client side. Consequently, since the certain agent may know only the vicinity of itself, it does not matter how many agents are present between the client and the server in the entire system. Therefore, the selection intermediary apparatus or the transmission apparatus of the present invention can also be applied to a multi-step agent constitution in which a separate agent acts as intermediary between the client-side agent and the server-side agent.

What is claimed is:

1. A selection intermediary apparatus comprising:

reception means for receiving a message transmitted from a transmission apparatus for transmitting the message;

output means for selecting and outputting the message received by said reception means on a predetermined selection condition;

condition generation means for generating a condition more moderate than the selection condition based on the selection condition by said output means; and advertisement means for presenting the condition generated by said condition generation means to said transmission apparatus, and requesting said transmission apparatus to select and transmit the message on the condition.

2. The selection intermediary apparatus according to claim 1 wherein said output means selects and outputs the message received by said reception means in accordance with a composite condition constituted of the logical product of a plurality of individual conditions, and in generating the condition, said condition generation means generates the condition constituted of the logical product of the remaining individual conditions obtained by excluding one or more individual conditions from said plurality of individual conditions.

3. The selection intermediary apparatus according to claim 1 wherein said output means outputs the message received by said reception means to a plurality of output destinations, and selects and outputs the message on the composite condition according to the output destination constituted of the logical product of one or more individual conditions, and in generating the condition, said condition generation means extracts the individual conditions common to the respective composite conditions of the selection by said output means, and generates the condition constituted of the logical product of the extracted individual conditions.

4. The selection intermediary apparatus according to claim 1 wherein said condition generation means receives a predetermined instruction, and newly generates a condition more moderate than the selection condition by said output means and stricter than the condition already applied to said transmission apparatus by said advertisement means, said selection intermediary apparatus comprises first cost comparison means which compares an application cost necessary for applying the condition newly generated by said condition generation means to said transmission apparatus with a transmission cost necessary for transmitting the message stopped from being transmitted from the transmission apparatus if the newly generated condition is applied to said transmission apparatus, and when said transmission cost is larger as a result of comparison by said first cost comparison means, said advertisement means applies the condition newly generated by said condition generation means to said transmission apparatus.

5. The selection intermediary apparatus according to claim 1 further comprising:

second cost comparison means for obtaining and comparing an intermediary cost of the message received by said reception means with a transmission cost incurred if the message is directly transmitted to the output destination of said output means from said transmission apparatus;

replication means for applying the same condition as the selection condition by said output means to said transmission apparatus, and requesting the transmission apparatus to select the message in accordance with the applied condition and directly transmit the message to the output destination of said output means; and switch means for operating said replication means instead of said advertisement means when a result of comparison by said second cost comparison means shows that the transmission cost is lower than the intermediary cost.

6. A transmission apparatus comprising:

input means to which a message is inputted;

transmission means for selecting and transmitting the message inputted to said input means;

condition acquirement means for acquiring a condition of selection by said transmission means from the transmission destination of said, transmission means;

third cost comparison means for comparing a necessary transmission cost incurred if the message inhibited from being transmitted as a result of the selection is transmitted by said transmission means, with an acquirement cost necessary for acquiring the condition by said condition acquirement means; and first transfer means for transferring the comparison result by said third cost comparison means to said transmission destination.

7. A transmission apparatus comprising:

input means to which a message is inputted;

transmission means for transmitting the message inputted to said input means;

fourth cost comparison means for obtaining and comparing a message transmission cost with an intermediary cost incurred if the message is relayed by an intermediary apparatus for relaying the message; and second transfer means for transferring the comparison result by said fourth cost comparison means to said intermediary apparatus.

8. A selection intermediary program storage medium which stores a selection intermediary program comprising:

reception means for receiving a message transmitted from a transmission apparatus for transmitting the message;

output means for selecting and outputting the message received by said reception means on a predetermined selection condition;

condition generation means for generating a condition more moderate than the selection condition based on the selection condition by said output means; and advertisement means for applying the condition generated by said condition generation means to said transmission apparatus, and requesting said transmission apparatus to select and transmit the message on the condition.

9. The selection intermediary program storage medium for storing the selection intermediary program according to claim 8 wherein said output means selects and outputs the message received by said reception means in accordance with a composite condition constituted of the logical product of a plurality of individual conditions, and in generating the condition, said condition generation means generates the condition constituted of the logical product of the remaining individual conditions obtained by excluding one or more individual conditions from said plurality of individual conditions.

10. The selection intermediary program storage medium for storing the selection intermediary program according to claim 8 wherein said output means outputs the message received by said reception means to a plurality of output destinations, and selects and outputs the message on the composite condition related with the output destination constituted of the logical product of one or more individual conditions, and in generating the condition, said condition generation means extracts the individual conditions common to the respective composite conditions of the selection by said output means, and generates the condition constituted of the logical product of the extracted individual conditions.

11. The selection intermediary program storage medium for storing the selection intermediary program according to claim 8 wherein said condition generation means receives a predetermined instruction, and newly generates a condition more moderate than the selection condition by said output means and stricter than the condition already applied to said transmission apparatus by said advertisement means, said selection intermediary program comprises first cost comparison means which compares an application cost necessary for applying the condition newly generated by said condition generation means to said transmission apparatus with a transmission cost necessary for transmitting the message stopped from being transmitted from the transmission apparatus if the newly generated condition is applied to said transmission apparatus, and when said transmission cost is larger as a result of comparison by said first cost comparison means, said advertisement means applies the condition newly generated by said condition generation means to said transmission apparatus.

12. The selection intermediary program storage medium for storing the selection intermediary program according to claim 8, the selection intermediary program further comprising:

second cost comparison means for obtaining and comparing an intermediary cost of the message received by said reception means with a transmission cost incurred if the message is directly transmitted to the output destination of said output means from said transmission apparatus;

replication means for applying the same condition as the selection condition by said output means to said transmission apparatus, and requesting the transmission apparatus to select the message in accordance with the applied condition and directly transmit the message to the output destination of said output means; and switch means for operating said replication means instead of said advertisement means when a result of comparison by said second cost comparison means shows that the transmission cost is lower than the intermediary cost.

13. A transmission program storage medium which stores a transmission program comprising:

input means to which a message is inputted;

transmission means for selecting and transmitting the message inputted to said input means;

condition acquirement means for acquiring a condition of selection by said transmission means from the transmission destination of said transmission means;

third cost comparison means for comparing a necessary transmission cost incurred if the message inhibited from being transmitted as a result of the selection is transmitted by said transmission means, with an acquirement cost necessary for acquiring the condition by said condition acquirement means; and first transfer means for transferring the comparison result by said third cost comparison means to said transmission destination.

14. A transmission program storage medium which stores a transmission program comprising:

input means to which a message is inputted;

transmission means for transmitting the message inputted to said input means;

fourth cost comparison means for obtaining and comparing a message transmission cost with an intermediary cost incurred if the message is relayed by an intermediary apparatus for relaying the message; and second transfer means for transferring the comparison result by said fourth cost comparison means to said intermediary apparatus.

* * * * *